United States Patent [19]
Hyde et al.

[11] 3,715,656
[45] Feb. 6, 1973

[54] METHOD AND APPARATUS FOR MEASURING THE CHARGE-TIME RESPONSE OF MATERIALS BY APPLYING A VOLTAGE STEP ACROSS THE SAME

[75] Inventors: Peter John Hyde, Codicote, Hitchin, Hertfordshire; Wilson Reddish, London Colney, Hertfordshire, both of England

[73] Assignee: Imperial Chemical Industries Limited, London, England

[22] Filed: May 27, 1971

[21] Appl. No.: 147,523

Related U.S. Application Data

[63] Continuation-in-part of Ser. No. 4,012, Jan. 19, 1970, abandoned.

[52] U.S. Cl. .................................324/61 R, 324/60 R
[51] Int. Cl. .............................................G01n 27/26
[58] Field of Search...................................324/60, 61

[56] References Cited

UNITED STATES PATENTS 2,791,750 5/1957 Menzel et al.........................324/60

*Primary Examiner*—Alfred E. Smith
*Attorney*—Cushman, Darby & Cushman

[57] ABSTRACT

A method and apparatus for measuring the charge-time response of an insulating material to a voltage step applied across it by applying to a capacitor containing a specimen of the material as dielectric, a voltage step or repeated voltage steps in the form of a pulse train, and sampling the charge on the specimen after a time interval from the application of the voltage step, said time intervals increasing logarithmically with successive samples. The charge-time response data obtained is particularly suited to the determination of permittivity and loss factor with frequency using approximations to the Fourier transform

24 Claims, 23 Drawing Figures

METHOD AND APPARATUS FOR MEASURING THE CHARGE-TIME RESPONSE OF MATERIALS BY APPLYING A VOLTAGE STEP ACROSS THE SAME

This application is a continuation-in-part application of U.S. Ser. No. 4012 filed on 19 Jan., 1970, now abandoned.

The invention relates to apparatus for the measurement of the charge-time response of a dielectric material when a voltage pulse is applied across a specimen of the material, and it also provides a method for the determination of dielectric parameters over a range of frequencies, based on the charge-time response obtained.

According to the invention, we provide an apparatus for measuring the charge-time response of an insulating material to a voltage step applied across it, which apparatus comprises:

a capacitor for containing a specimen of the material as dielectric, a step generator connected to said capacitor for applying thereto a voltage step or repetition of such voltage steps in the form of a pulse train, a detector arranged to detect the charge on the specimen and to provide a signal proportional to said charge at its output, a sampler connected to the output of the detector, and having gating means and logarithmic timing means controlling the operation of said gating means so as to obtain from the output of the detector after a time interval from the application of the voltage step or successive steps, successive samples of the signal representing the charge on the specimen in consequence of said voltage step or steps applied thereto, said time interval being increased logarithmically with successive samples, and a data store arranged to receive the samples.

Where only a single voltage step is applied to the capacitor, the sampling will occur as a series of similar operations carried out at logarithmically separated times. A similar action may be taken for each pulse when the voltage step is repeatedly applied to the capacitor as a train of pulses, but the number of samples may be limited by the length of each pulse. However, the provision of a series of pulses is particularly useful, as will be described in more detail hereinafter, in that it enables a single sample to be taken in respect of the charge flowing in consequence of each pulse applied to the specimen, the time interval between applying the pulse and taking the sample being increased logarithmically with successive pulses. The pulses may then be spaced sufficiently to enable any desired operation to be carried out on each sample before the next is taken. It is intended that the sample taken for any one pulse should be comparable with that taken for any other pulse, and hence to avoid the necessity of applying correction factors, we prefer each pulse to have substantially the same amplitude as subsequent pulses. We further prefer that the pulse generator be arranged to apply to the capacitor a train of rectangular pulses, each pulse having the same predetermined duration and said pulse train having substantially equal increments of time between successive pulses.

In a preferred method of applying the voltage step to the samples, an equal voltage step of opposite polarity is also applied to a reference capacitor in which the dielectric has substantially no dielectric loss, and the quantity of charge measured is the sum of the charges which flow into the sample and into the reference capacitor. This has the effect of neutralizing that part of the charge/time response which occurs prior to the beginning of the first sampling interval. Thus the apparatus preferably has a reference capacitor in which the dielectric has substantially no dielectric loss, said reference capacitor and the capacitor containing the specimen being connected in series by connecting means, said connecting means being also connected to the input of the detector; the step generator being a bipolar step generator arranged to apply equal voltage steps or pulses of opposite polarity substantially simultaneously to the two capacitors. The reference capacitor is conveniently an air capacitor.

The detector employed will depend largely on the input requirements of any subsequent processing circuit. In our preferred forms of apparatus processing circuits are employed which require an input of a voltage which is a function of the charge flowing into the sample. Our preferred detector comprises an electrometer amplifier having an input stage comprising an insulated gate field effect transistor followed by one or more amplification stages, a capacitor being connected in parallel with said input and amplification stages to provide an output voltage proportional to the charge applied at the input stage.

The complex permittivity $\epsilon^*(\omega)$ relates the current passing through a material to the potential across it, and may be resolved into real and imaginary components $\epsilon'(\omega)$ and $\epsilon''(\omega)$ where $\epsilon''(\omega)$ is a measure of the dielectric loss of the material and is known as the loss factor. Thus $$\epsilon^*(\omega) = \epsilon'(\omega) - j\epsilon''(\omega)$$

The complex permittivity may be given in terms of the current (i) flowing at a time (t) by the Fourier transform:

$$\epsilon^*(\omega) = \int_0^\infty i(t) e^{-j\omega t} dt$$

where $\omega$ is the angular frequency. Because any set of experimental data will only cover a finite range of time, errors will arise when applying the Fourier integral to experimental data, due to the cutting off of the integral at both small and large values of t. However, approximations to the transform may be developed, and may be applied to experimental data, if suitable data is available. The charge-time response measured according to the invention, is particularly suited to the determination of the dielectric parameters using approximations to the Fourier transform, and such determinations may readily be carried out automatically. Hence in the apparatus of the invention, the data store may form part of a data processing circuit and the time for which the data is stored may then be very short, e.g. the interval between successive samples while the data is awaiting processing.

The Hamon approximation, discussed in an article entitled "An approximate method for deducing dielectric loss factor from direct-current measurements" by B.V. Hamon, B.Sc, B.E. in Proceedings of the Institution of Electrical Engineers 1952, 99, Pt IV (Monograph No 27), expresses the loss factor $\epsilon''$ as a function of frequency $\omega$ in terms of a unidirectional current response $i(t)$, measured as a function of time, by the expression $$\epsilon''(\omega) \cong A.t.i(t)$$

Where $\omega = 2\pi/10t$, and $A$ is a constant.

The current $i(t)$ passing through the material is connected with the total charge that has flowed by $$q(t) = \int_0^t i(t)dt$$

Thus, $$i(t) = \frac{d}{dt}(q(t))$$

and $$\frac{d(q(t))}{d(\log_e t)} = t \cdot i(t)$$

Hence $\epsilon''(\omega)$ may be determined by taking the derivative of $q(t)$ with respect to $\log_e t$, and this may conveniently be automatically computed from the data obtained by applying a single voltage step across a specimen of the material as indicated above.

We therefore provide a method of determining the dielectric loss of a material over a range of frequencies by applying a voltage step across a sample of the material, measuring the quantity of charge which flows into the sample in the intervals between logarithmically separated times, and computing the loss factor ($\epsilon''$) with frequency ($\omega$) according to the equation $$\epsilon''(\omega) \simeq A \frac{d(q(t))}{d(\log_e t)}$$

where $q(t)$ is the quantity of charge flowing through the sample at a time $t$ and A is a constant.

Our preferred method of carrying out this determination comprises transforming the charge into a voltage proportional to the charge, measuring the change in the voltage which occurs during the intervals between logarithmically separated times, and using the value obtained of the change in voltage for computing the loss factor.

In order to obtain automatically values of the loss factor using the Hamon approximation, the output from the detector may be fed to a processing circuit, and in our preferred apparatus, the sampler and data store are incorporated into a processing circuit comprising a sampling stage connected to the output of the detector, and having gating means for obtaining samples of the signal provided at the output of the detector and representing the charge on the specimen, a logarithmic clock connected to said gating means to provide control signals for the operation of the gating means in obtaining said samples at successive logarithmically separated times after the application of a voltage step to the specimen, subtracting means connected to the sampling stage and arranged to determine the differences between successive samples, and read-out means connected to the output of the subtracting means and to the logarithmic clock for providing said differences in conjunction with the number of the sample in each case.

The processing of the signals may therefore be readily carried out by means of a computer. However, we provide a circuit which may be directly applied to processing signals derived from a detector as hereinbefore described.

In our preferred processing circuit the sampling stage comprises a control gate operable according to control signals from the logarithmic clock, a counter, a linear clock producing a continuous train of pulses of constant frequency, said pulses being fed to both the counter and the subtracting means via said control gate, and a comparator for comparing the signal stored in the counter with the input signal, said comparator being arranged to apply an inhibit signal to said control gate when the analogue of the signal stored in the counter is greater than or equal to the input signal. Thus pulses from the linear clock are counted by the counter until an inhibit signal is applied to the control gate. The digital signal held in the counter is converted to analogue form and is continuously compared with the input signal (representing the charge flowing into the sample) by the comparator. When the two signals become equal, an inhibit signal is applied to the control gate, which then prevents the pulses from being fed to both the counter and the subtracting means. Thus the number of pulses which are fed to the subtracting means is proportional to the input signal.

The sampling intervals are defined by the logarithmic clock which provides an inhibit signal of fixed duration to the control gate at each of the logarithmically separated times.

In the preferred apparatus the subtracting means is a second counter controlled by the logarithmic clock, the pulses supplied from the linear clock via the control gate being fed to said second counter during each of the sampling intervals; the number of the pulses accumulating during each interval being fed to the read-out means and the counter reset on a signal from the logarithmic clock applied to the counter during the period in which the inhibit signal is being applied to the control gate by the logarithmic clock.

The read-out means selected depends on the processing circuit employed. Where the memory device is a second counter, the number stored in the counter (being proportional to the charge which flows into the sample during each interval) may be displayed and plotted along a first axis against the number of time intervals along a second axis whereby the first axis is proportional to the dielectric loss and the second axis is proportional to the logarithm of the frequency. Such a graph may be prepared automatically by the read-out means. Thus where the data is processed by a computer, the computer may be programmed to produce the results in various ways such as a graph of dielectric loss against the logarithm of frequency, or as a set of numbers giving the loss factor for the desired frequencies.

In the preferred apparatus, the read-out means comprises a digital to analogue convertor and an oscilloscope, the signal from the second counter being applied to one of the deflection axes of the oscilloscope while a signal which increases by an equal increment for each interval is applied from the logarithmic clock to the second deflection axis of the oscilloscope. Thus the position of the spots on the oscilloscope screen represents a good approximation of $\epsilon''(\omega)$ at equal intervals of $\log_e (\omega)$. The results so displayed may be readily photographed to provide a permanent record of the results of the determination. The oscilloscope is preferably adapted to retain on its screen the image of each set of signals for the duration of the determination.

A typical apparatus records twenty $\Delta q(t)$ readings after logarithmic intervals on a basic time interval of 1 ms, the logarithmic base being 2, i.e. readings are taken after 2 ms, 4 ms, 8 ms, 16 ms, 32 ms, 64 ms, and so on for 20 readings. The full range of readings is obtained in just under 17.5 minutes. This corresponds to a frequency range of $10^{-4}$Hz to $10^2$Hz.

The method and apparatus of the present invention may be used for the evaluation of the dielectric losses of any dielectric materials including semi-conducting materials. It is especially useful for liquid and solid dielectric materials with one or more phases present having dielectric losses greater than 0.0001. Synthetic polymeric materials, e.g. polymethyl methacrylate, polyethylene terephthalate, nylon and polyvinyl chloride, glasses, ceramics, and rubbers may be investigated by the method and using apparatus of the invention.

Thus the invention provides a method for obtaining the dielectric loss of a material for a range of frequencies, both quickly and automatically. It is therefore particularly suitable for the speedy determination of dielectric loss by persons who are not skilled physicists. For example, the method may be employed in product control in the production of dielectric materials, where a plant operator controls the reaction parameters, or where the plant is adapted to automatically adjust the reaction parameters in accordance with signals derived from the apparatus for determining the dielectric loss. The apparatus may also be particularly useful in research work into the dielectric properties of chemical compounds by providing dielectric characteristics of the compounds both quickly and automatically.

In order that the invention may be more readily understood, a specific apparatus, and the method by which it is employed to obtain the dielectric parameters, is described below by way of example and with reference to FIGS. 1 to 8 of the drawings, in which.

Figure 1:
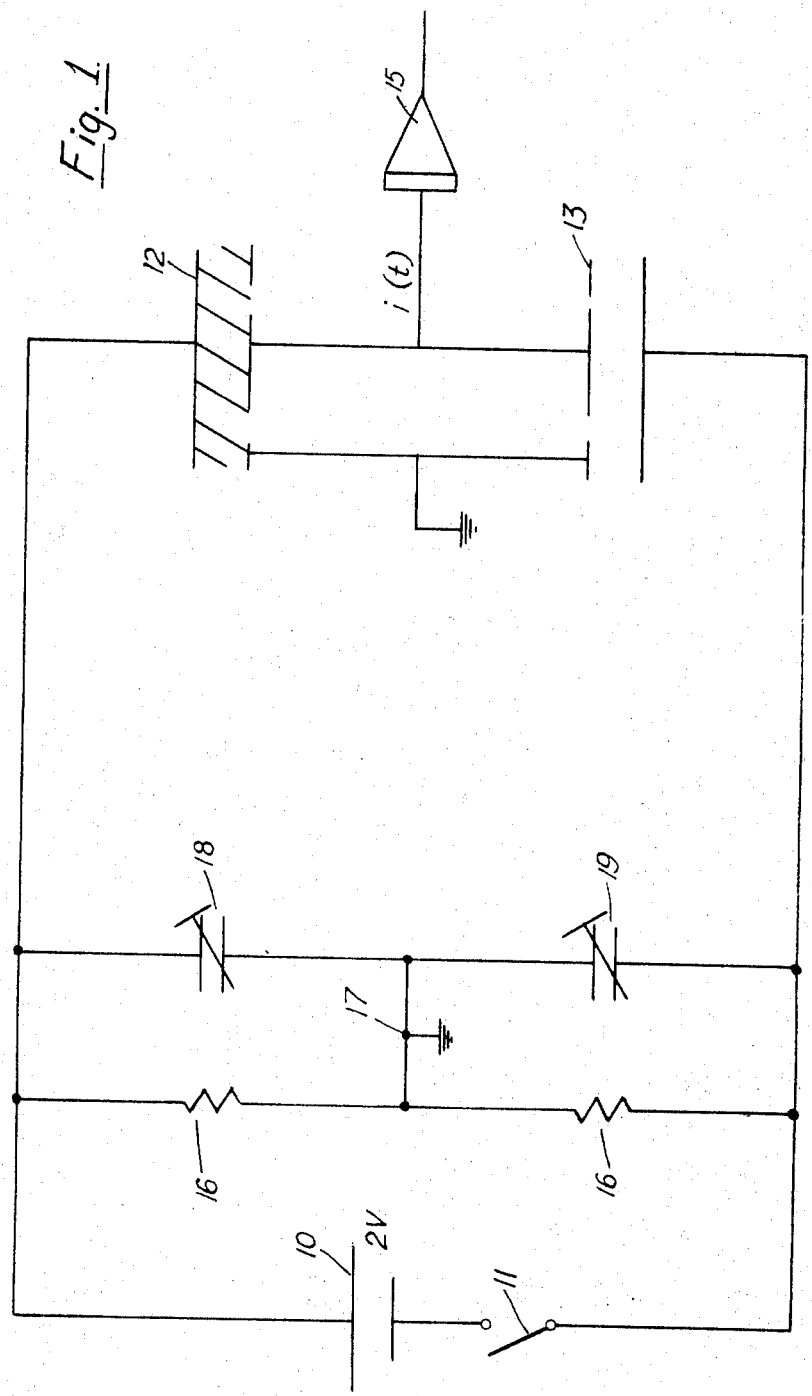
FIG. 1 is a diagram of the circuit used to apply a voltage step to the dielectric material.

FIG. 1 shows a steady voltage source 10 providing a supply through a magnetically operated mercury wetted reed relay switch 11 which, when closed, applies a fast voltage step to the circuit. The specimen of dielectric material is located in a capacitor 12 which is a three terminal guarded electrode system. Polytetrafluoroethylene insulators are used to support the electrodes. A capacitor 13, of similar construction to the capacitor 12 but containing only air, is located in the circuit to cancel out that part of the charge/time response which occurs before the first sampling interval. In the typical charge/time curve shown in FIG. 2 this cancelled part is equivalent to the charge response shown by the dotted line A. When this part is cancelled out the level of the time axis is effectively raised to the level of the line A. Cancellation of this part involves applying an equal and opposite voltage step to the air capacitor 13 to that applied to the specimen capacitor 12 and summing the currents passing through the capacitors 12 and 13 into the virtual earth of an electrometer integrator circuit shown schematically at 15 in FIG. 1 and in detail in FIG. 3. This is achieved by applying a voltage across the resistors 16 which has a value twice that which must be applied across the specimen capacitor 12. Each of the resistors 16 has a value equal to $10^5$ ohm and their junction is earthed at 17. Variable trimming capacitors 18 and 19 of maximum value 1000 pF connected across the resistors 16 are used to balance out the effects of assymetrical earth capacitances at the specimen side of the circuit.

Figure 3:
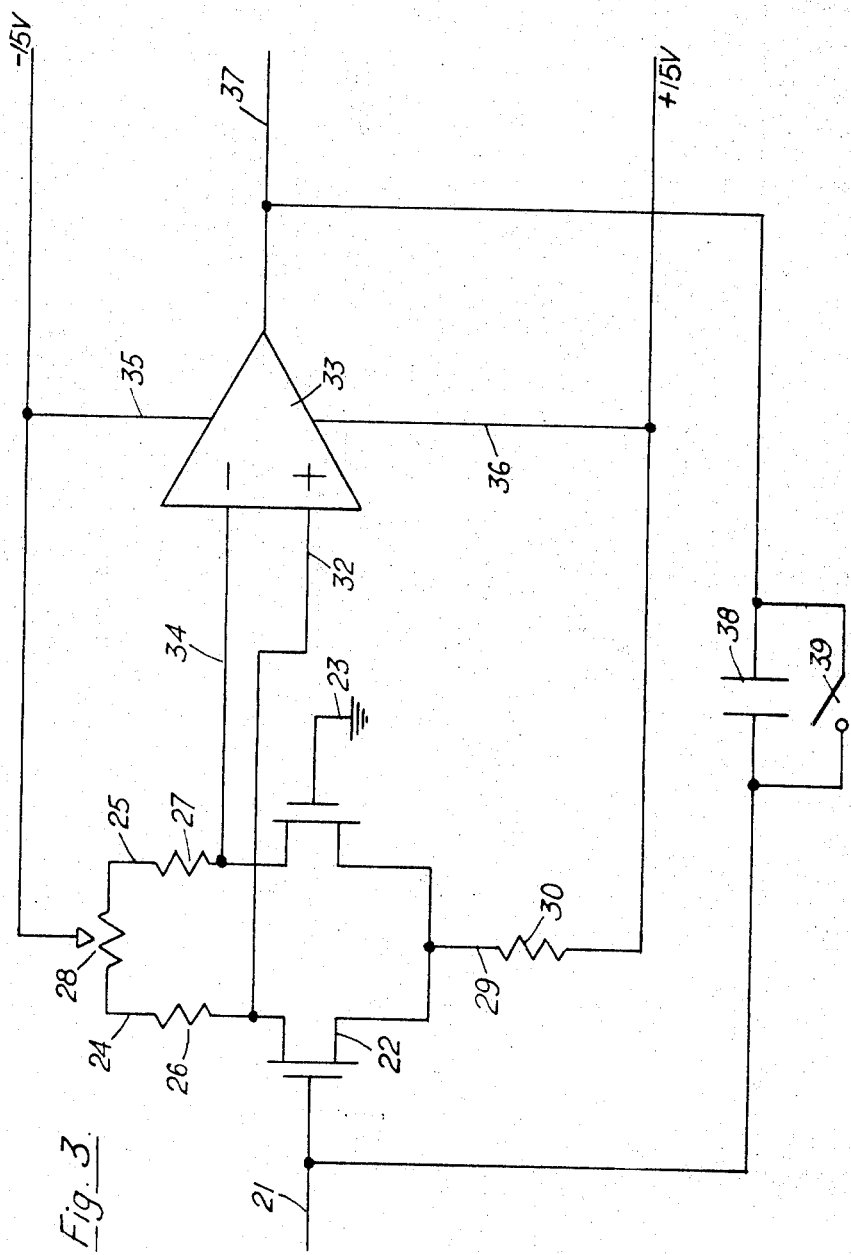
FIG. 3 is a diagram of the electrometer integrator circuit shown schematically in FIG. 1.

The current $i(f)$ which is the sum of the currents flowing through the specimen capacitor 12 and the air capacitor 13 is fed to the electrometer circuit 15. The detail of this circuit is shown in FIG. 3. The current $i(t)$ is fed to the virtual earth input 21 which is connected to one gate terminal a Fairchild F100049 dual insulated gate field effect transistor 22 (which is a dual p-channel enhanced mode transistor having a maximum gate current of $10^{-15}a$). The other gate terminal is connected to earth at 23. Two leads 24 and 25 including 5K ohm resistors 26 and 27 respectively extend from the transistor 22 and are linked by a tapped potentiometer 28 of value 10K ohm. A negative 15 volt potential is connected to the moving contact of the potentiometers 28. A further lead 29 is connected via a 30K ohm resistor 30 to a positive 15 volt potential. The lead 24 is connected via resistor 26 to lead 32 which is connected to the positive input side of a Fairchild uA709 integrated circuit operational amplifier 33 (having a differential input offset voltage $<$ 6mV, an input bias current $<$ 500 nA at 20° C, an output voltage swing $< \pm$ 12V, and input voltage range $< \pm$ 10V and an open loop voltage gain $\geq$ 25000) which is connected by the lead 35 to the negative 15 volt potential, and by a lead 36 to the positive 15 volt potential. An output lead 37 is taken from the amplifier 33. This output lead 37 is connected via a polystyrene integrating capacitor 38 having a value in the range from 3 pF to 1000 pF to the input 21. A switch 39 is connected in parallel with the capacitor 38.

The effect of the interconnection between the transistor 22 and the amplifier 33 is to produce a negative signal amplified in magnitude from the input current $i(t)$. This signal is superimposed on the input by feedback along the line carrying the capacitor 38 to counteract any fluctuations in the input producing a virtual earth at the junction of the feedback line and the input 21. The input signal $i(t)$ almost all of which passes into the integrating capacitor 38 since the input current to the transistor must be essentially zero, is integrated to result in a negative voltage signal at the output lead 37 proportional to the charge, $\Delta q(t)$, at the point of time after applying the potential to the specimen capacitor 12.

Figure 2:
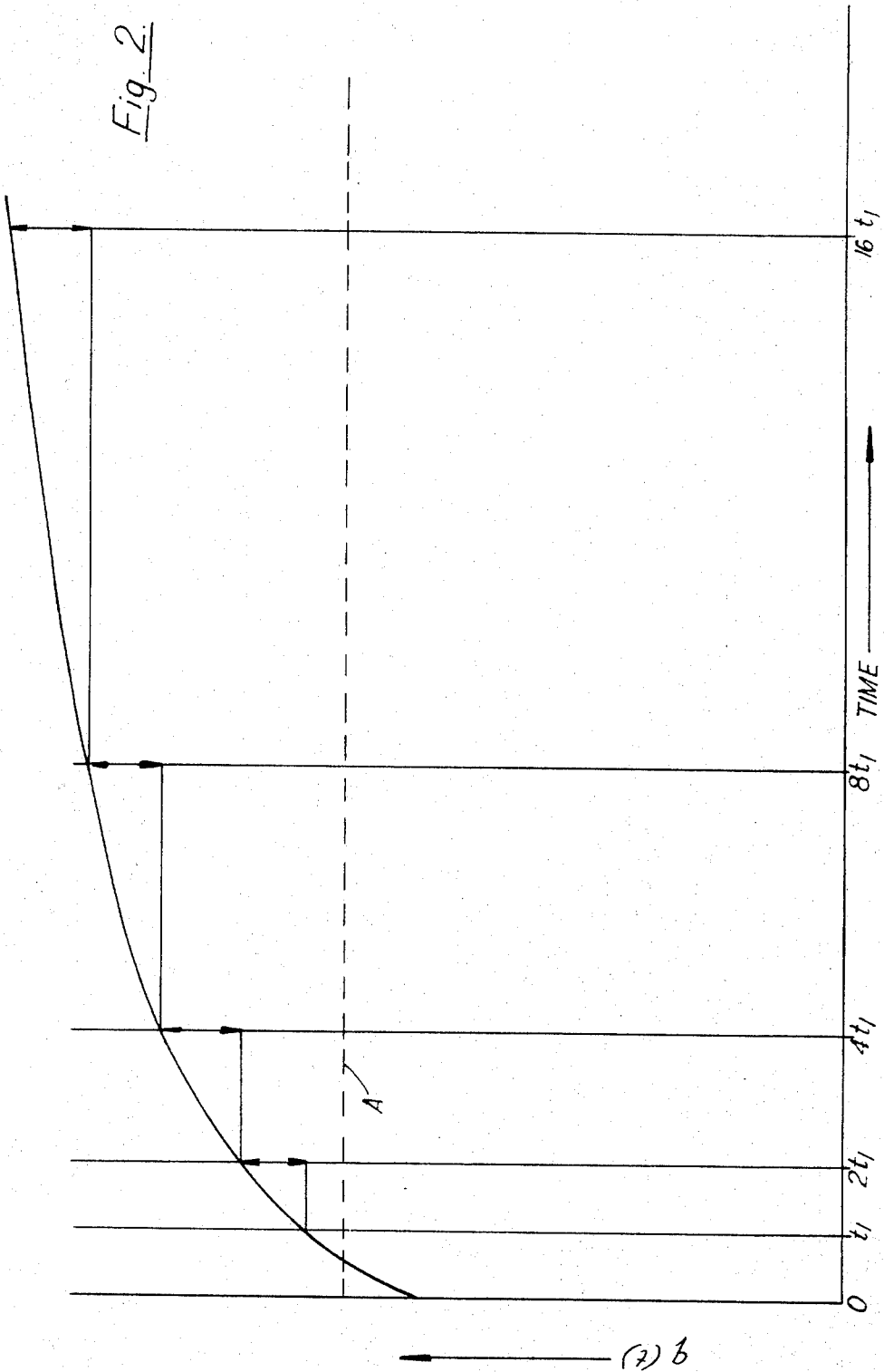
FIG. 2 shows a typical charge/time curve which may be obtained with the apparatus of the invention and is included for the purpose of explanation.
Figure 4:
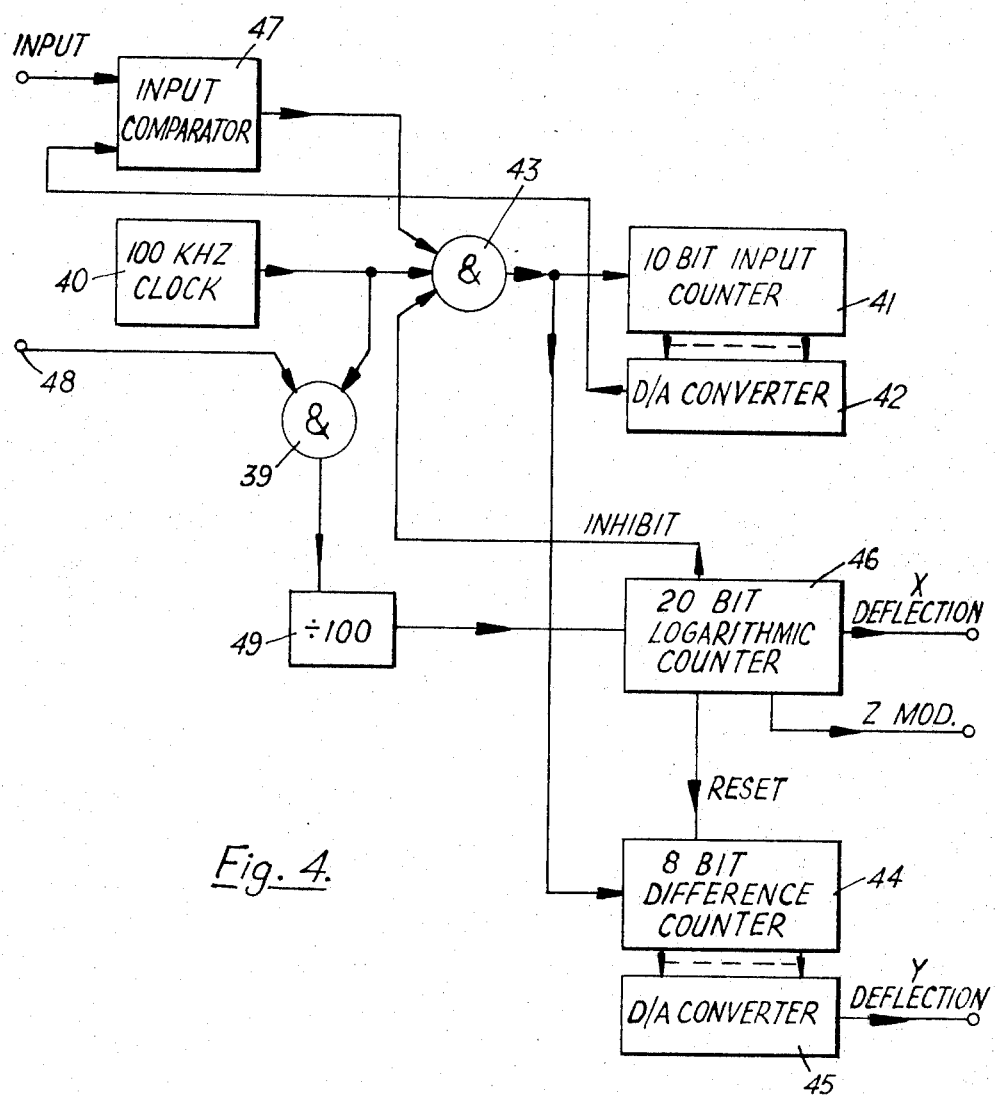
FIG. 4 is a block diagram of the processing circuit employed.

A timing clock 40, as shown in the processing circuit given in FIG. 4, is employed to provide a timed basis for determining when the signal supplied by the measuring circuit 15 should be sampled and recorded. In FIG. 2 the basic time interval for sampling is $t_1$ equal to 1 ms. Samples are taken at logarithmically spaced intervals of $t_1$ on the logarithmic base 2, 20 samples being taken in all. For instance the first sample is taken between 1 ms and 2 ms, the reading being recorded after 2 ms. The clock 40 has a basic timing rate of 100 kHz. The incoming signal proportional to $\Delta q(t)$, from the measuring circuit 15 is passed to an input comparator 47 which compares it with the feedback from the converter 42. When the two signals are equal the comparator prevents further pulses being passed from the clock 40 through a gate 43 and into a main 10 bit input counter 41, whereas, if the feedback signal from the converter 42 is less than the input signal, the comparator allows clock pulses to pass into the counter 41.

Figure 5:
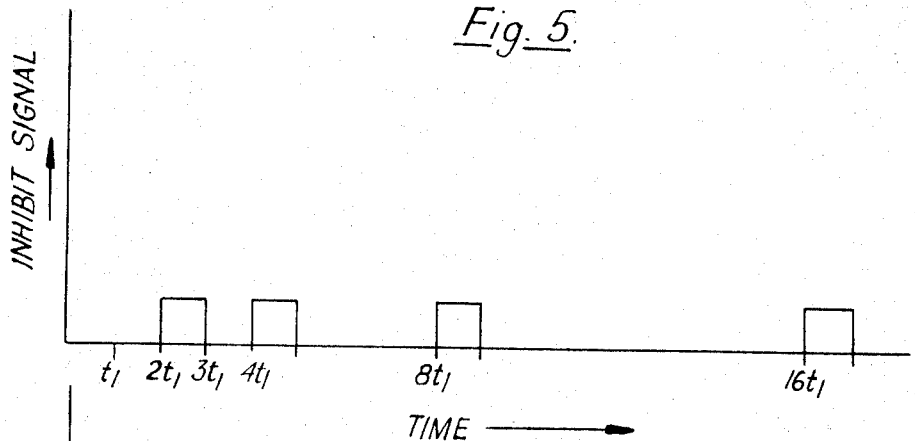
FIG. 5 is a plot showing the emission of inhibiting signals for the logarithmic counter.
Figure 6:
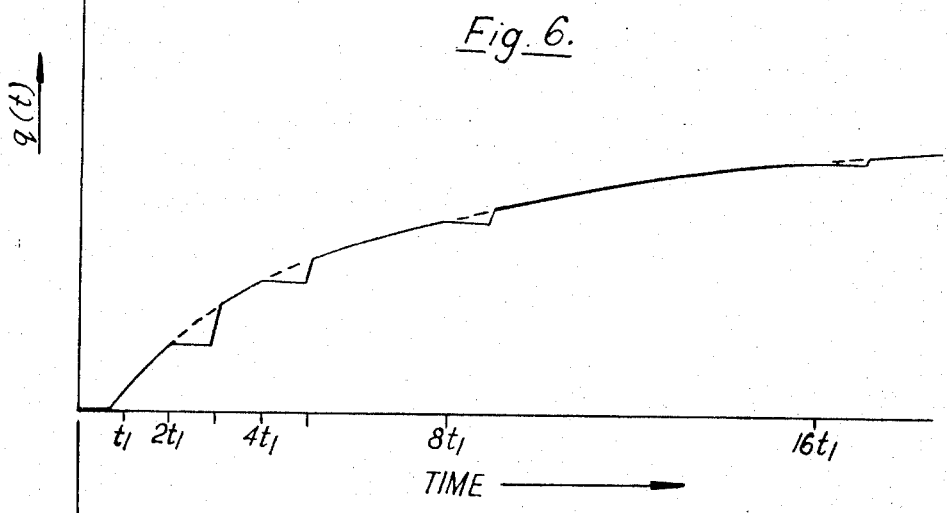
FIG. 6 is a plot of the inhibited charge/time response.
Figure 7:
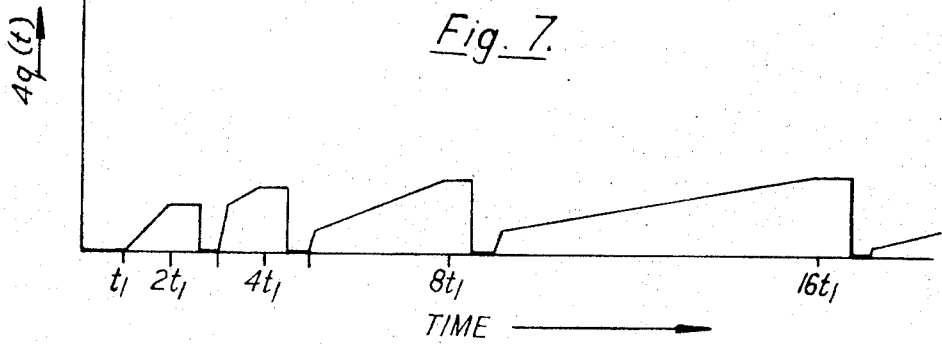
FIG. 7 is a plot of the output from the difference counter.

At the logarithmically chosen intervals of $t_1$ as shown in FIG. 2 the operation of the counter 41 is inhibited for 1 ms and that of the difference counter 44 for 0.5 ms. Inhibiting signals are fed to the gate 43 by a 20 stage binary logarithmic counter 46 at the logarithmic intervals $t_1$, $2t_1$, $4t_1$, and so on. Pulses are fed to counter 46 from the clock 40 via a gate 39 and a frequency divider 49. The counter operates to detect the state prior to the one at which an inhibiting pulse must be emitted, and a one pulse delay is then applied to obtain the correct timing. FIG. 5 indicates the inhibiting pulses, in a binary state which are of a 1 ms duration. When an inhibiting pulse is emitted by the counter 46 the pulse is fed into the gate 43 thereby preventing the passage of input pulses from the clock 40 via the gate 43 to the counter 41 and to the counter 44 during the duration of the inhibit pulse. The operation of the counter 41 is inhibited for 1 ms and that of the counter 44 for 0.5 ms, the latter being reset during the second 0.5 ms. While the gate 43 is under the influence of the inhibiting pulse, the feedback signal from the converter 42 is inhibited as shown in FIG. 6 in the form of inhibited steps at logarithmic intervals of $t_1$. Similarly, the output from the counter 44 is inhibited, but for periods of 0.5 ms only as shown in FIG. 7. Thus the counter 44 is inhibited and reset during the total 1 ms inhibiting period.

The difference counter 44 serves to compute the difference in charge on the specimen capacitor 12 between successive logarithmic intervals of $t_1$. While the counter 44 is inhibited, its analogue state, obtained through the converter 45 is displayed as the y-deflection and stored on a storage oscilloscope screen and afterwards the counter 44 is reset to zero. During the 0.5 ms inhibition of the difference counter 44 an intensity modulation pulse triggered by the inhibit pulse is emitted from the Z modulation output of the counter 46. This is fed to the y-deflection of the oscilloscope screen which is permanently connected to an analogue converter 45. The intensity modulation pulse serves to intensify the electron beam in the oscilloscope tube representing the signal from the converter 45 to a magnitude which is visible and is stored on the oscilloscope screen. The nature of the output signal from the converter 45 at logarithmic intervals of $t_1$ is shown in FIG. 7. The x-deflection signal on the oscilloscope screen is derived from a binary counter (not shown in FIG. 4) clocked by the inhibit signal from the counter 46 which has been decoded into analogue state. This serves to place successive points at equal intervals along the x-axis thereby giving a good approximation to $\epsilon''(\omega)$ at equal intervals of log ($\omega$).

The 10 bit counter 41, which is of conventional design, is constructed from integrated circuit flip flops. The logical output of each flip flop is fed to the digital to analogue converter 42.

A start control signal derived from the voltage across one of the resistors 16 in the circuit shown in FIG. 1 is fed into the circuit shown in FIG. 4 at 48 and thus to gate 39. Clock pulses from the clock 40 are also fed to gate 39. When the voltage step is applied to the specimen, clock pulses are allowed to pass the gate 39 and to pass to the counter 46 via a clock frequency divider 49. The clock divider 49 is included to avoid a random timing error which might otherwise appear in the application of the start signal to the logarithmic counter 46. When the clock pulse has passed the gate 39 under the action of the start signal the 100 kHz pulse is divided by 100 in the divider 49 before being passed to the counter 46. Thus the origin of counting in the counter 46 is synchronized with the moment at which the voltage step is applied to the specimen capacitor 12 by switching the switch 11.

Figure 8:
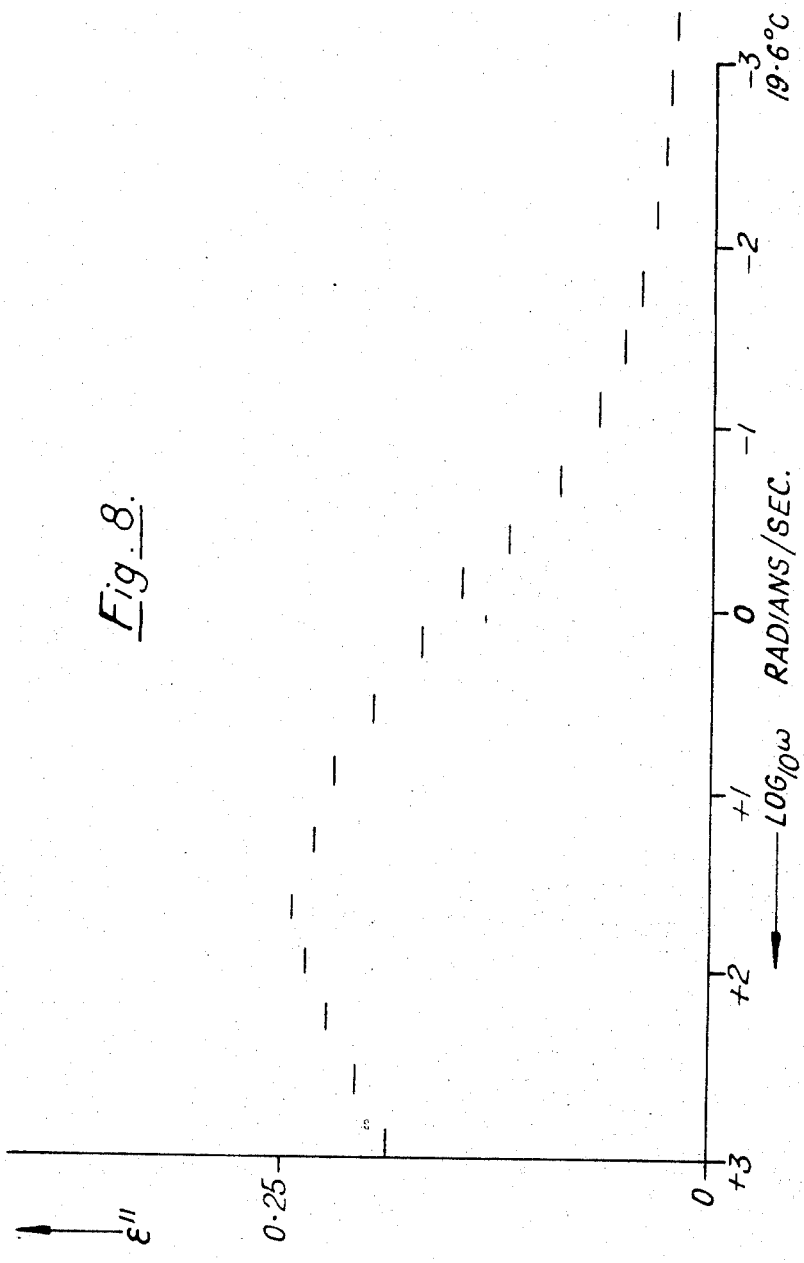
FIG. 8 is a reproduction of the display given on an oscilloscope screen in an experiment conducted on polymethyl methacrylate sheet.

FIG. 8 shows the display obtained when the experiment using the apparatus described with reference to FIGS. 1 to 7 was conducted on a sheet of polymethyl methacrylate at 19.6° C. The outputs from the converter 45 were recorded at logarithmic intervals of $t_1$. The basic interval $t_1$ was 1 ms and the logarithmic base 2. According to the method described in this specification the axes of this display are labelled $\epsilon''$ and log$\omega$. The complete plot was obtained in just under 17.5 minutes.

In practice the apparatus described above for the determination of dielectric parameters using the Hamon approximation is limited in respect of the frequency for which values of the parameters may be determined, by the speed at which the apparatus is capable of detecting the charge and storing the signal representative of that change. We have found that a time range of $10^{-3}$s to $10^{+3}$s (covering frequencies from about $10^2$Hz to $10^{-4}$Hz), could suitably be covered using the apparatus described above, but shorter sampling times might be obtainable using the same general techniques, if the sampling and processing times were reduced, e.g. by successive approximation and faster converters.

However, by taking successive samples from successive pulses, the pulses may be separated sufficiently to enable adequate processing time to be provided. We have therefore developed further approximations to the Fourier transform which enable both the dielectric parameters to be obtained by taking the samples from successive pulses. The time scale is thereby conveniently extended to a range of $10^{-7}$s to $10^{-1}$s to give the parameters over a frequency range of from about $10^6$Hz to $10^0$Hz. Again these are ranges which may conveniently be obtained and are not intended to represent absolute limits.

For obtaining successive samples from successive pulses, various general purpose devices may be programmed to sample the charge in the logarithmic manner of the present invention. However, we prefer to employ a purpose-built sampler comprising
 a logarithmic clock,
 a switch operated on a signal from said logarithmic clock,
 a first storage capacitor connected to the output of the detector via said switch, whereby said storage capacitor is charged substantially to the output voltage of the detector when said switch is closed,
 a second storage capacitor arranged to be dischargeable linearly at a controlled rate,
 means for charging said second storage capacitor with a voltage dependent on the voltage of said first storage capacitor, and
 a timed ramp analogue to digital converter operative according to the time taken to discharge said second capacitor.

In order to illustrate the manner in which the charge/time data may be obtained, and the dielectric parameters determined automatically therefrom, a suitable specific apparatus will now be described by way of example, with reference to the remaining drawings, FIGS. 9 to 23. Although the part of the apparatus relating to the determination of the charge/time data is essentially the same as that used in the other spectrometer described hereinabove (except for the repetition of the step function), the apparatus as a whole will be described for clarity and completeness. We have derived approximations suitable for use with this apparatus, and these are therefore included in this description.

Figure 9:
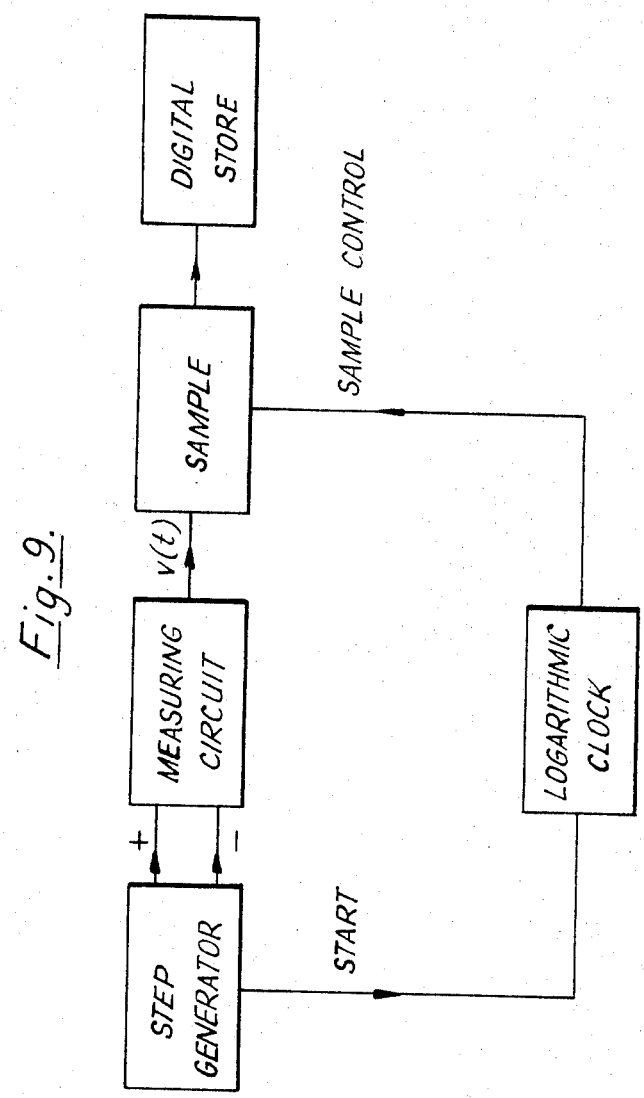
Figure 10:
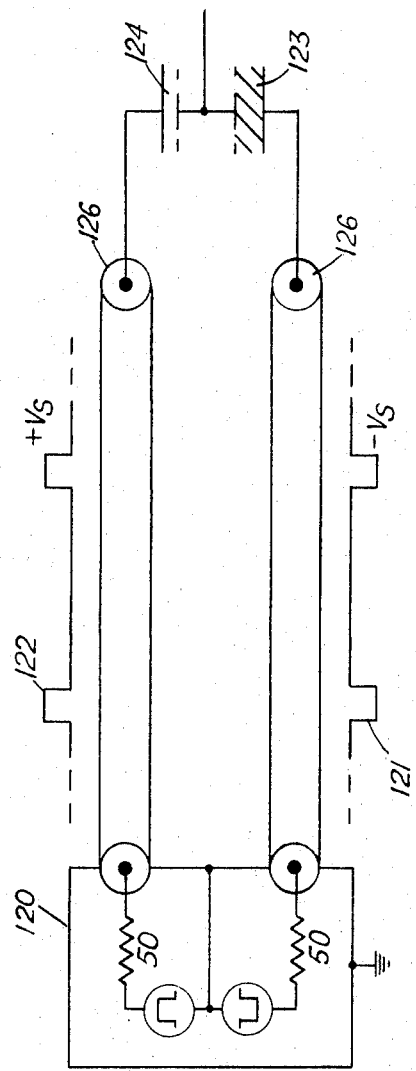
Figure 11:
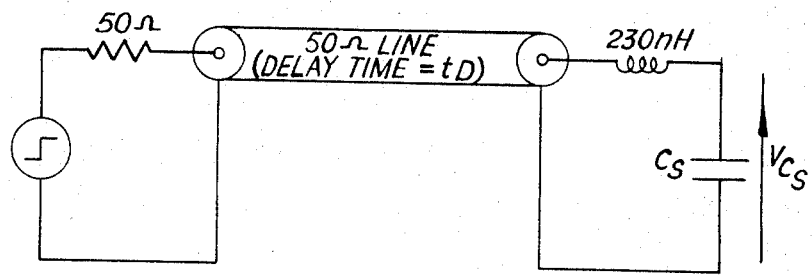
Figure 12:
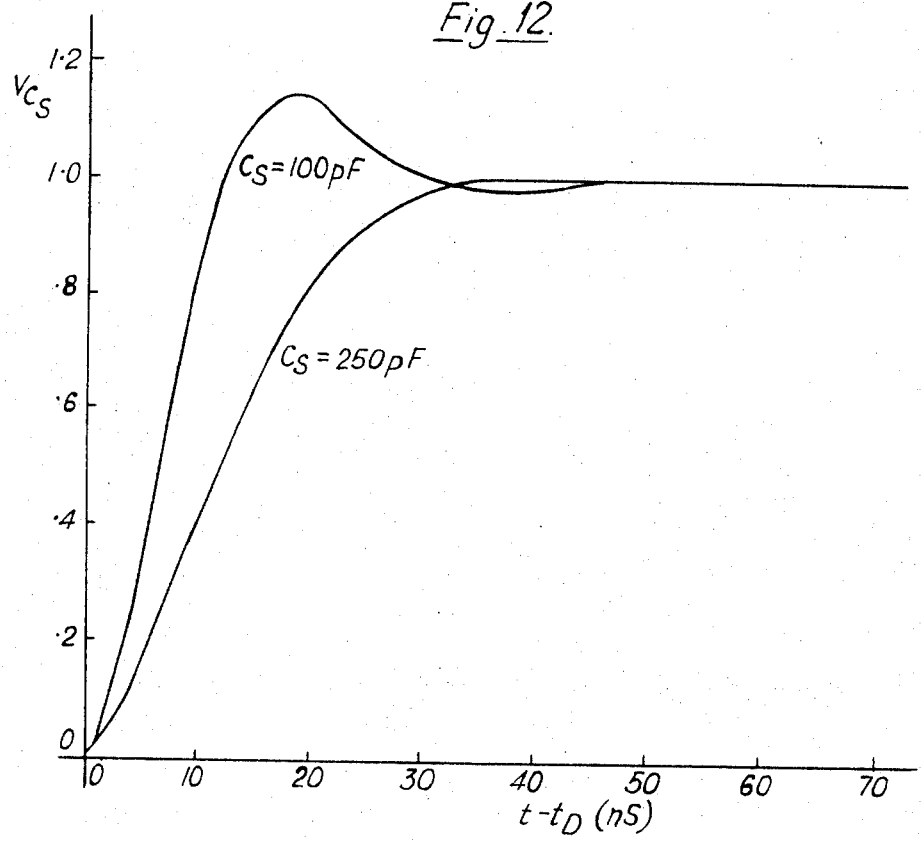
Figure 13:
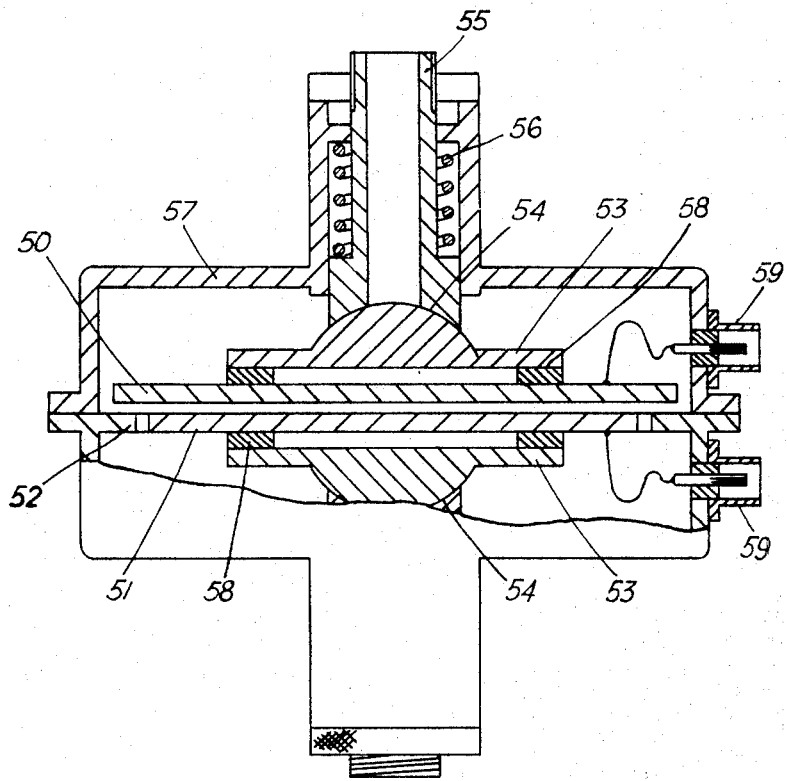
Figure 14:
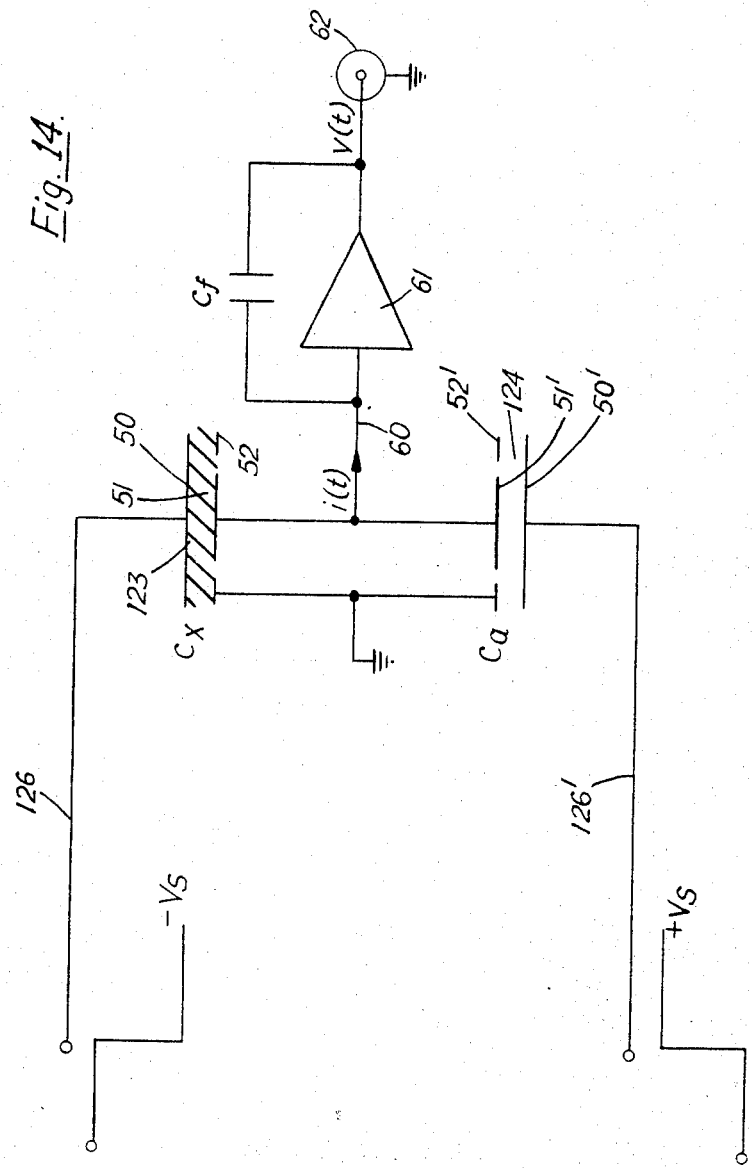
Figure 15:
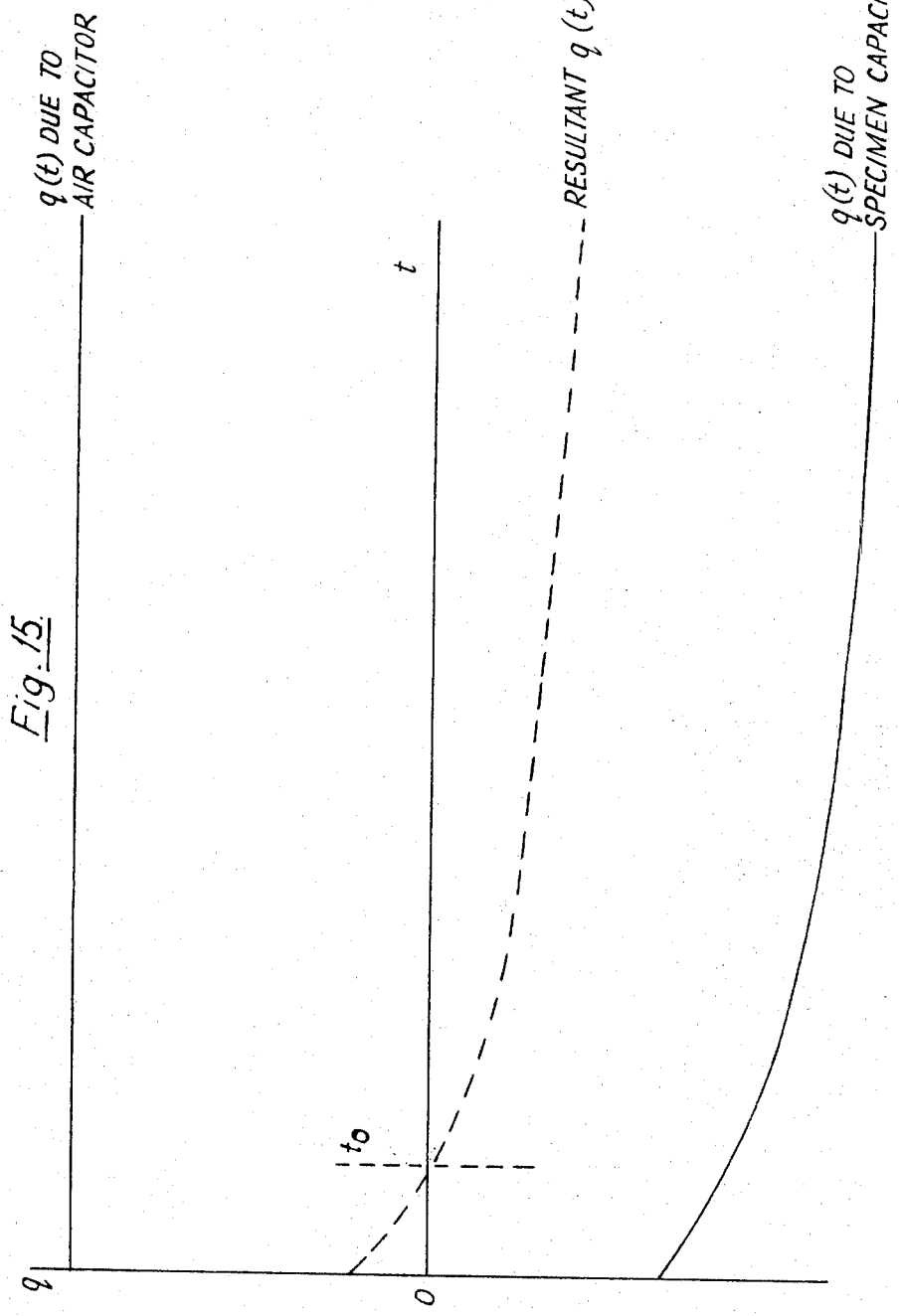
Figure 16:
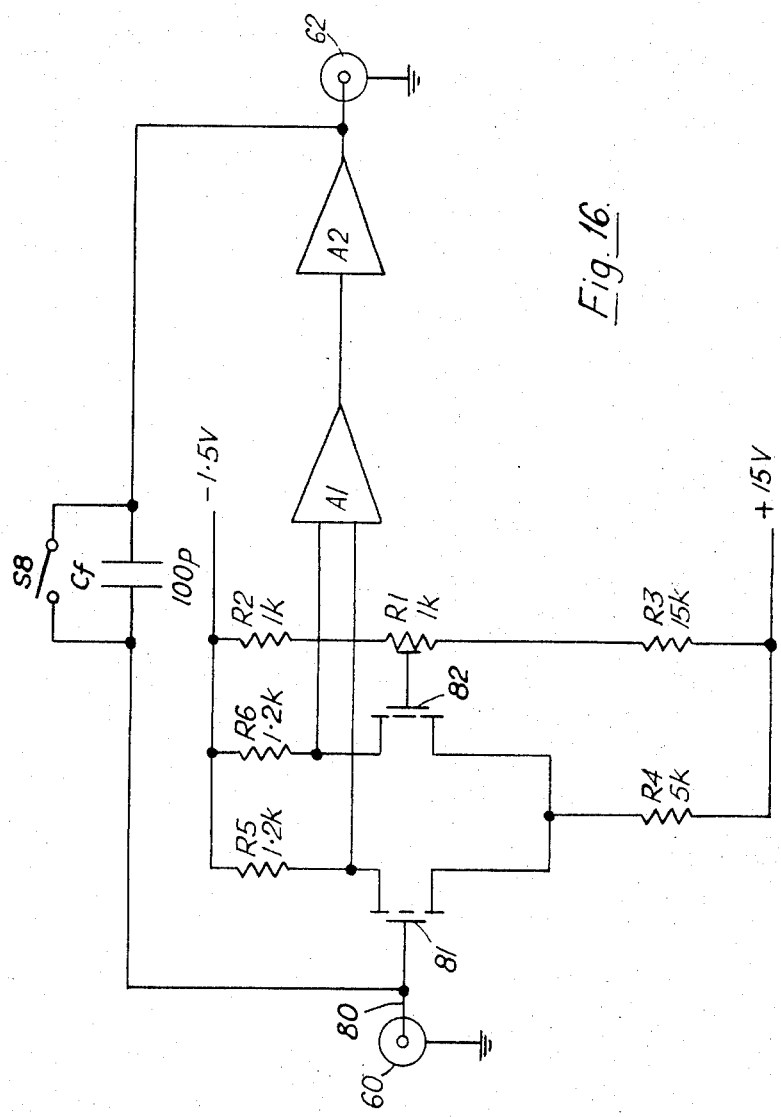
Figure 17:
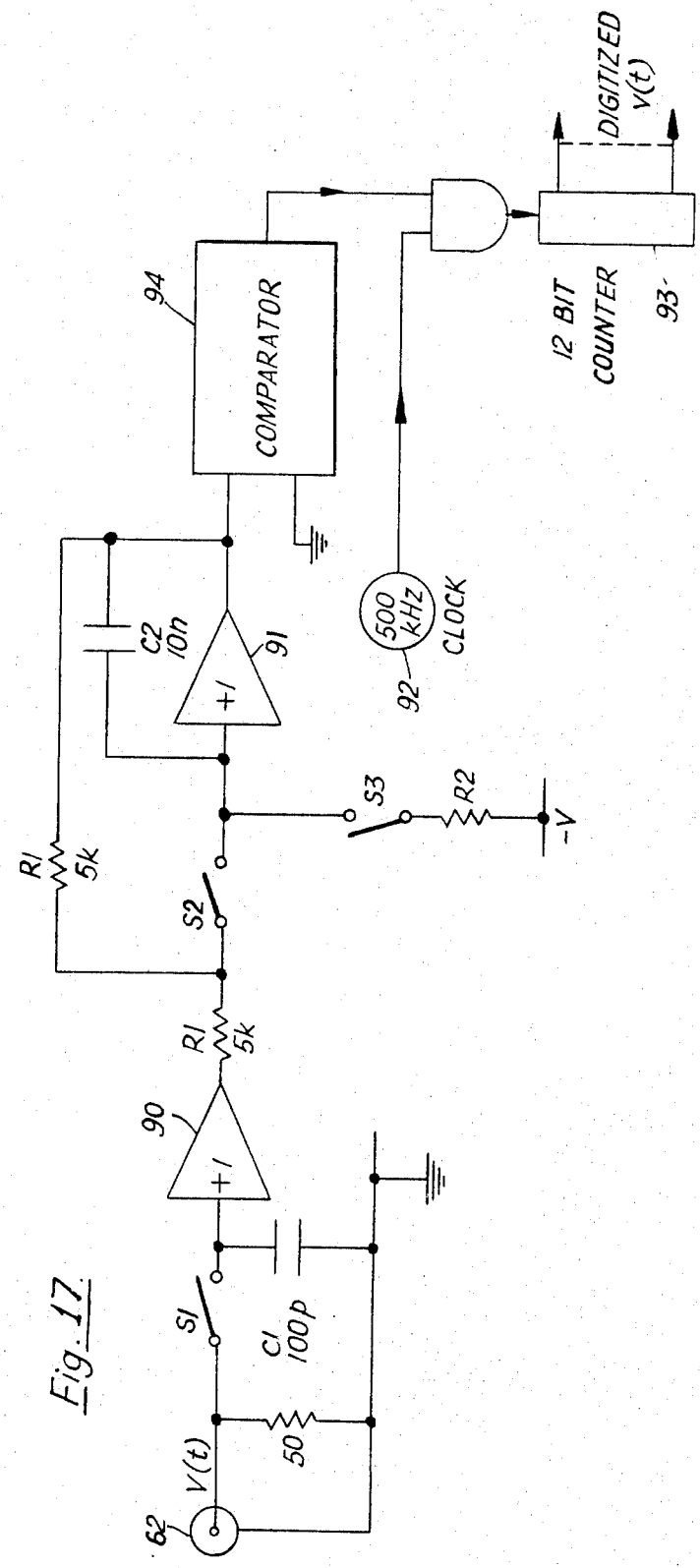
Figure 18:
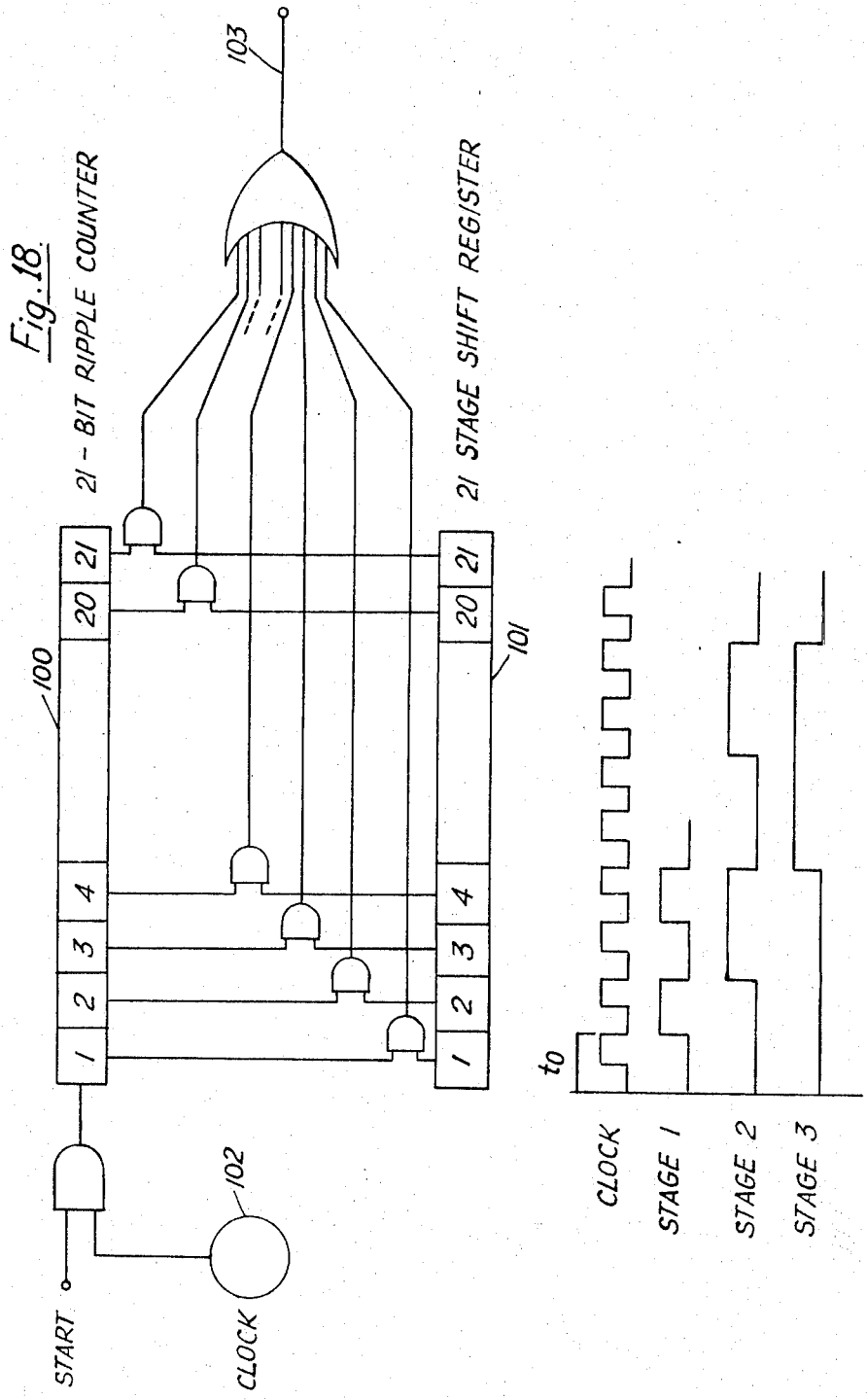
Figure 19:
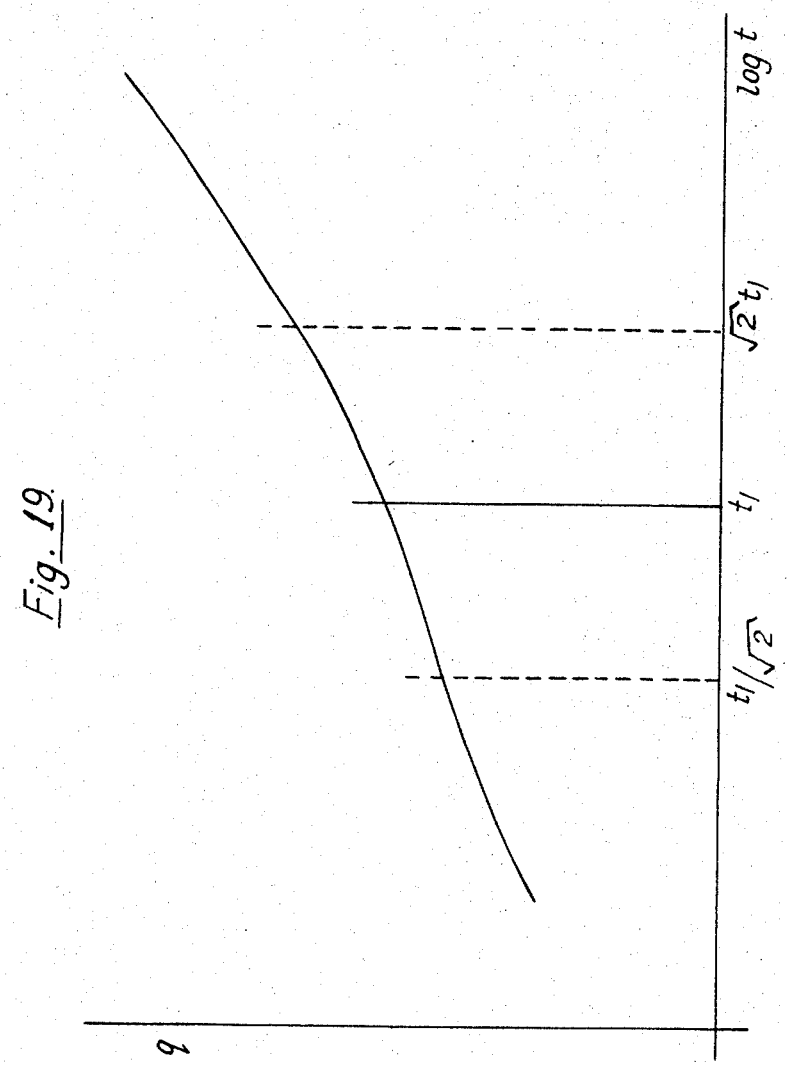
Figure 20:
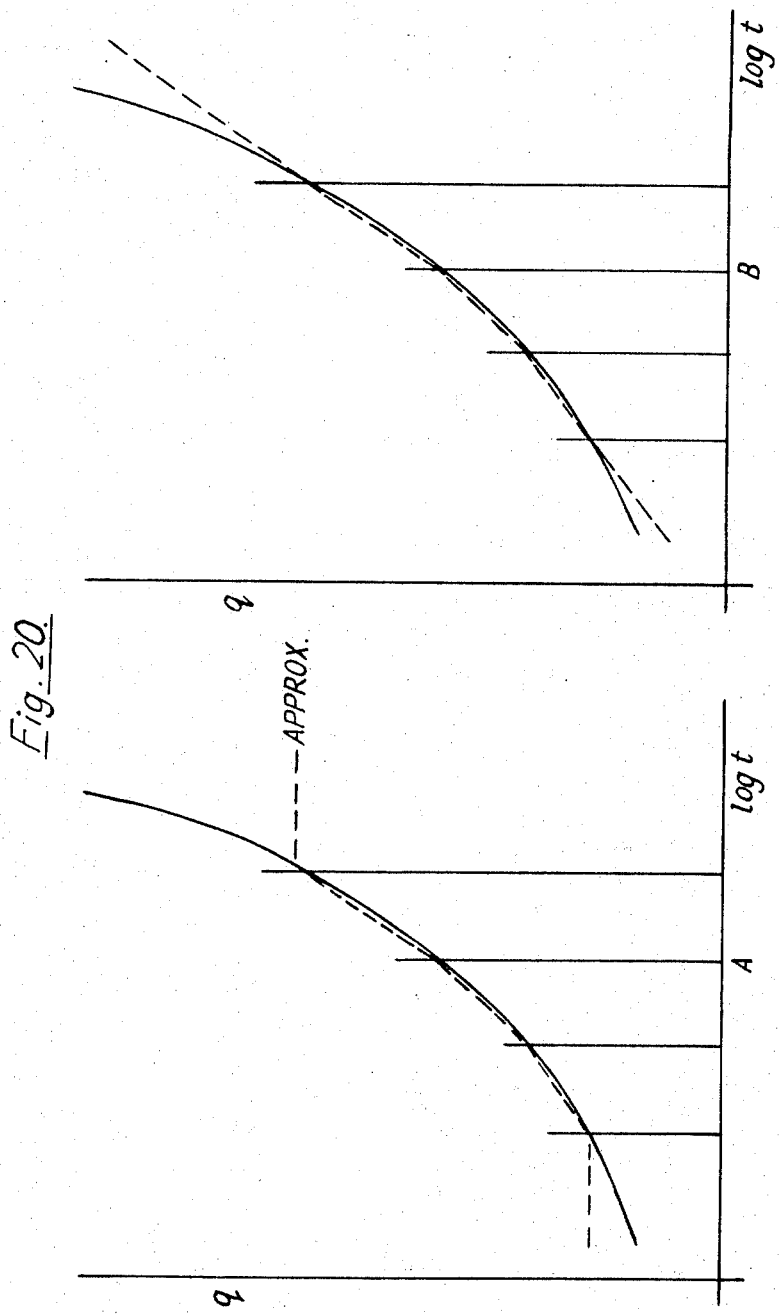
Figure 21:
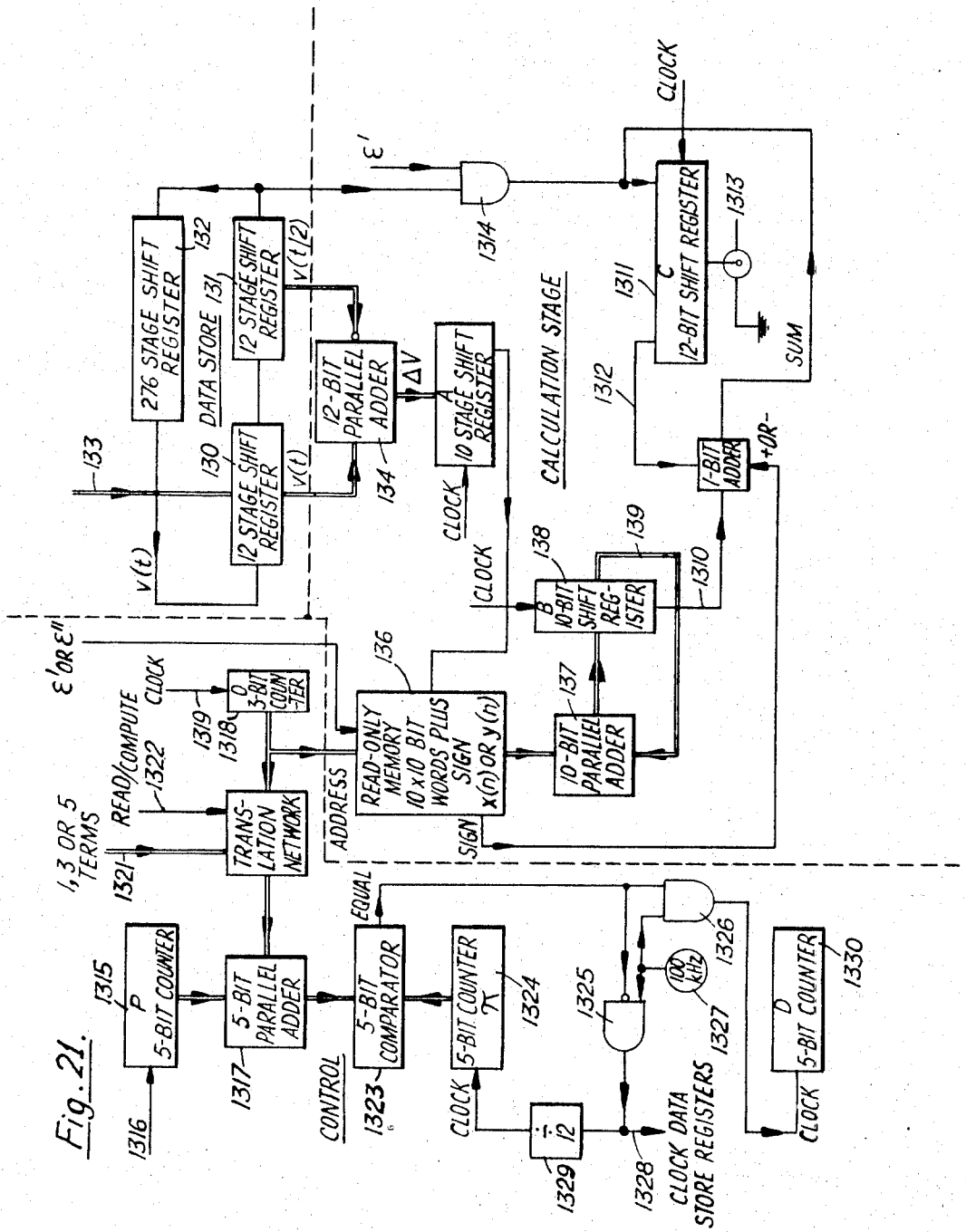
Figure 22:
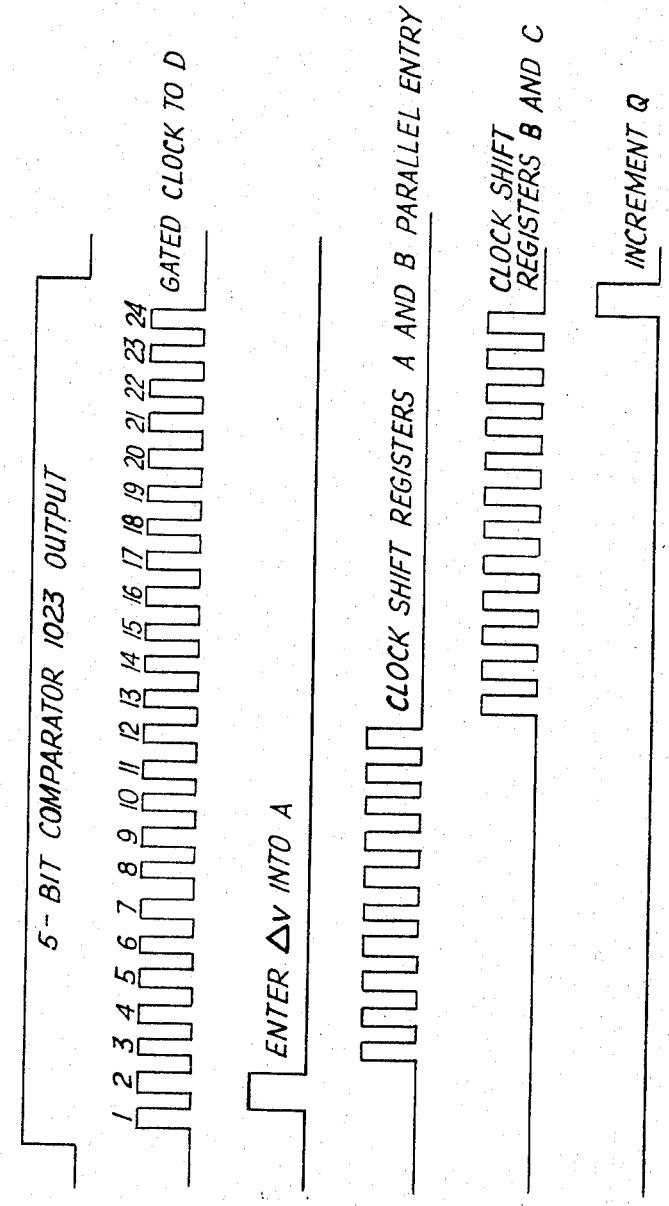
Figure 23:
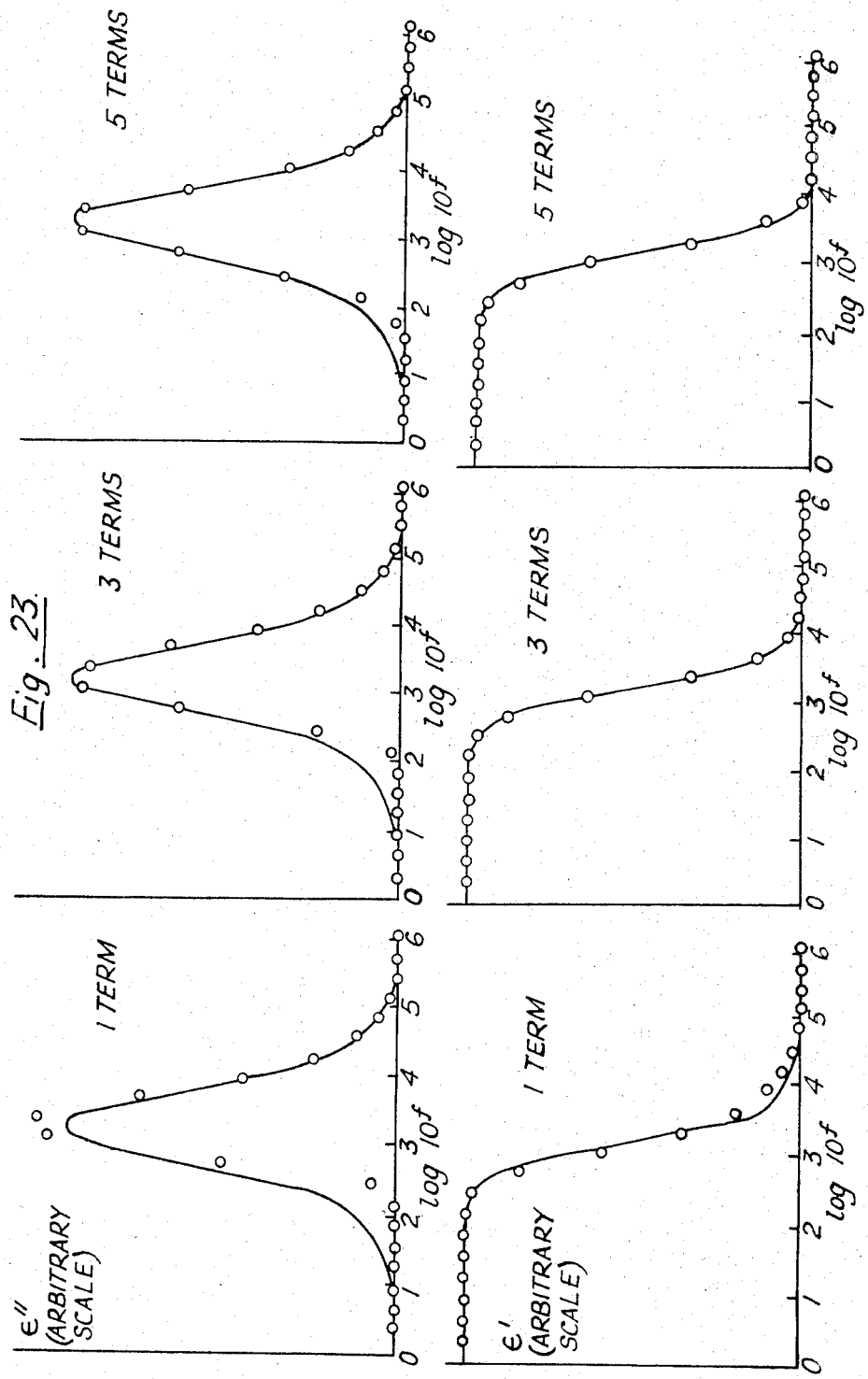

In FIGS. 9 to 23 of the accompanying drawings:
 FIG. 9 is a block diagram of the apparatus,
 FIG. 10 is a diagram of the pulse generator showing the pulses which are transmitted to specimen and reference capacitors,
 FIG. 11 is a model circuit for a short time pulse generation system in which a voltage is applied across the specimen capacitor,
 FIG. 12 is a graph of the voltage appearing across the specimen capacitor plotted against a function of time for two values of the capacity of the specimen capacitor and determined using the model circuit of FIG. 11,
 FIG. 13 is a partial cross-section though the reference capacitor,
 FIG. 14 is a diagram of the measuring circuit,
 FIG. 15 shows graphically the charges with respect to time due to the air capacitor and the specimen capacitor respectively,
 FIG. 16 is a diagram of the detector,
 FIG. 17 is a diagram of the sampler incorporating a digitizer,
 FIG. 18 is a diagram of the logarithmic clock,
 FIG. 19 shows graphically the function to be approximated,
 FIG. 20 shows graphically approximations to the charge-time response,
 FIG. 21 is a diagram of a data processing means
 FIG. 22 shows diagrammatically the processor arithmetic control signals and
 FIG. 23 shows experimental results obtained for a Debye lumped circuit.

The apparatus is shown in a block diagram in FIG. 9. A pulse generator (shown in FIG. 10) provides repeated simultaneous equal voltage pulses of opposite polarity to a measuring circuit (shown in FIGS. 13-15) and starts a logarithmic clock (shown in FIG. 17). In the measuring circuit, voltage pulses of opposite polarity from the step generator are applied simultaneously to the specimen capacitor containing the dielectric material, and to a reference air capacitor respectively. The charge $q(t)$ on the specimen, is the integral of the current $i(t)$ flowing through the specimen capacitor, and in the measuring circuit the integral of this current minus a constant level due to the reference capacitor is converted to a voltage $v(t)$. For each voltage step, a sample of $v(t)$, where it increases logarithmically with succeeding voltage steps, is converted to a digital signal in the sampler (shown in FIG. 16), which is controlled by the logarithmic clock. The digital signals from the sampler are read into a digital store from which they may be retrieved as required. Thus, for example, they may be used for the automatic determination of the dielectric parameters using a processing network of the kind described hereinafter.

Pulse Generator

For the pulse generator which provides the equal voltage pulses of opposite polarity, there are three basic requirements:
 i. Both steps should occur as nearly as possible simultaneously; any delay of one with respect to the other should be very small compared with the first time interval, $t_o$, where $t_o$ may be as low as $10^{-7}$s.
 ii. The rise time should be much less than $t_o$ and the leading edges should be clean for example, if a mechanical switch is used there should be no contact bounce,
 iii. The amplitude of the steps should be flat for their duration (i.e. no droop), and the repeated pulses should be constant with time.

A suitable pulse generator is a bipolar pulse generator (120) having a 50Ω source impedance, such as a Hewlett Packard 8003A as shown diagrammatically in FIG. 10. The pulses (121 and 122) are applied to the specimen and air capacitors (123 and 124) respectively by means of equal lengths of 50Ω coaxial cable (126). Reflections from the capacitive terminations are absorbed by the sources. The rise time at the pulse generator terminals is less than 5 ns which is very small compared with the $t_o$ of 100 ns, but there is a second contribution to the rise time at the specimen due to the finite rate at which the specimen capacitance can be charged by the transmission line. A model circuit for a short time step generation system is shown in FIG. 11 in which a voltage ($V_{Cs}$) is applied across a specimen capacitor ($C_s$). In FIG. 12 the voltage appearing across the specimen capacitor is plotted against a function of time for two values of $C_s$. Since the output impedance of the source is identical with the characteristic impedance of the line, reflections from the terminations are completely absorbed. The maximum capacitance which would be used in practice for $C_s$ is about 250pF and this second contribution to the rise time is found to be about 20 ns. The result is an overall rise time of about 21 ns still sufficiently small with respect to $t_0$.

For the specimen and reference capacitors (123 and 124) identical three terminal systems are used so that the active area of the specimen is very well defined, and edge leakage effects are virtually eliminated. A suitable capacitor is illustrated in FIG. 13, and comprises a larger and a smaller plate (50 and 51), with an earthed ring (52) substantially co-planar with the smaller plate (51). The two plates are mounted on and insulated from identical supporting members (53), the shape of the outer faces (54) of which form part of a sphere. The plates are retained in position by spring-loaded retaining members (55), biased towards the sample by springs (56). The plates are surrounded by an earthed case (57) from which they are insulated by PTFE rings (58). Connections to the plates are made by coaxial sockets (59) in which the insulation is PTFE. For insulation with respect to earth, PTFE is used throughout; fused silica has been tried but it was found that quite large stray currents, probably arising from the effects of surface contamination, were generated even in a nominally dry atmosphere. The effects are almost absent with the present arrangement. Lead inductances, which could be troublesome for short time measurements, are minimized by the use of short direct paths. A value of about 230 nH has been obtained for the series inductance of the capacitor system, using a high frequency impedance measuring technique.

In the specimen capacitor, a specimen of about 5 inches diameter, and 0.1 cm thick is mounted between the plates, and the spherical joints allow a limited amount of non-parallelism of the specimen faces to be accommodated.

Specimens

To ensure a faithful $q(t)$ response particularly at long times the electrodes should be in good contact with the specimen whose surfaces should, therefore, be essentially planar. If this is not so, resort must be made to conducting electrodes applied to the surface of the specimen: either deposited aluminum or tinfoil stuck on with purified petroleum jelly is satisfactory. The complex permittivity resolution of the system is directly proportional to the specimen capacitance and there is thus usually good reason to use the highest value possible. However, the rate of rise of the voltage step is determined mainly by $C_s$, being roughly inversely proportional to it (FIG. 4) and levels of $C_s$ much greater than 250 pF are undesirable.

Measuring Circuit

In the measuring circuit illustrated in FIG. 14, the two capacitors (123 and 124) are connected by a coaxial line (60) to an integrating amplifier (61), having an output (62) for connection to the sampler. The pulse generator provides a series of voltage pulses along the lines (126 and 126') to the larger plates (50 and 50') of the specimen and air capacitors (123 and 124) respectively. The two smaller plates (51 and 51') are interconnected and provide the input (60) for the amplifier (61). Hence the current $i(t)$ measured by the amplifier gives the difference in the charges on the two capacitors (123 and 124), and thus gives a measure of the charge $q(t)$ on the specimen.

The charges on the plates of the two capacitors in response to the voltage pulse and the resultant $q(t)$ on the specimen, are shown graphically in FIG. 7 where charge q is plotted against time (t)

The amplifier used for this purpose is effectively an electrometer with a rise time of less than 10 ns and is illustrated in FIG. 16. The current $i(t)$ flowing between the two capacitors (123 and 124) is fed via the line (60) to the virtual earth input (80) which is connected to one gate terminal (81) of a dual enhancement mode insulated gate field effect transistor such as the Fairchild F10049 (which is a dual p-channel enhanced mode transistor having a maximum gate current of $10^{-15}$ A). The other gate terminal (82) is connected to the slider of a variable 1 k$\Omega$ resistor R1, the two ends of which are connected via 1 k$\Omega$ and 15 k$\Omega$ resistors R2 and R3, to $-1.5$ and $+15$ V supplies respectively. The two sources are connected together and then to the $+$ 15 V supply via a 5 k$\Omega$ resistor R4. The two drains are connected to an amplifier A1, and to the $-1.5$ V supply via 1.2 k$\Omega$ resistors R5 and R6 respectively.

Amplifier A1 is a wide band operational amplifier such as the Texas Instruments SN7510L (having a band width of 40 MH$_z$ and an open loop voltage gain of about 100). Amplifier A1 is followed by a driver stage A2, such as the National Semiconductor NH 0002C, which makes it possible to drive a 50$\Omega$ load at up to a maximum output of about 4 V; this facility is necessary when a delay line is required between the measuring circuit and the sampler to compensate for propagation delays in the logic circuits of the logarithmic clock. The feed-back capacitor $C_f$ is a standard polystyrene component of 100 pF, and exhibits negligible leakage. The amplifier performance may be summarized as follows:

| | |
|---|---|
| Open loop gain | 200 |
| Closed loop short term d.c. stability | 20 $\mu$V/minute |
| Rise term | 10 ns |
| Input current | about $3.10^{-16}$ A. |

The switch S8, used for resetting the integrator is a read capsule with an insulation resistance of $> 10^{16}\Omega$, operated manually by a permanent magnet.

The output from the measuring circuit is fed to the sampler and digitizer via a 50$\Omega$ coaxial cable 62, and is given as v(t) where:

$$v(t) = \frac{-1}{C_f} \int i(t) dt$$
$$= \frac{-q(t)}{C_f}$$

Sampler

The technique adopted according to the invention is to take one sample of v(t) from each of a succession of pulses spaced by 1 s, and the time which elapses from the onset of the pulse to the time at which the voltage is sampled increases logarithmically with succeeding pulses. The analogue signal v(t) is then converted to digital form before being fed to a processing means.

The apparatus employed is shown diagrammatically in FIG. 9, and is a double sample and hold system followed by a timed ramp analogue to digital convertor. At the start, switches S1 and S2 are closed and S3 is open; each of these switches is an insulated gate field effect transistor controlled by a logic signal. Up to the sampling time, capacitor C1 is continuously charged via switch S1 to the instantaneous value of v(t) within a small error. At the moment of sampling, S1 is opened by a signal from the logarithmic clock, and C1 holds the required value of v(t). This voltage is transferred by a relatively slow unity gain, high input impedance, amplifier (90) (such as a Fairchild μA709 preceded by a dual field effect transistor) to a second amplifier (91) such as a Fairchild μA709) which with S2 closed is also in a unity gain configuration. After a time of about 1 ms, when the system has come to equilibrium, but C1 has not discharged significantly, S2 is opened, S3 is closed and the 500 kHz crystal controlled clock (92) is started by appropriate timing signals, the clock feeding pulses into a 12-bit counter (93). Initially, C2 is charged to the sampled value of v(t) but commences to discharge linearly through resistance R2 when S2 is opened and S3 is closed. When C2 is discharged, the output of amplifier (91) has fallen to zero and this is sensed by the comparator (94) which turns off the clock input to the counter (93), which then contains a measure of v(t) at the time of sampling.

The limiting factors of this system are associated with S1; the time constant resulting from the 'on' resistance of S1, about 200Ω, and C1 sets a limit to the rate of change of v(t) that can be dealt with faithfully. C1 cannot be reduced significantly because this merely increases errors caused by charge transference when S1 is opened, and by leakage effects. However, the system is capable of sampling at $10^{-7}$s with an error of less than 1 percent and far better than this at longer times.

The sampling is controlled by a logarithmic clock as illustrated in FIG. 10, which comprises a combination of a 21-bit ripple counter (100) with a 21-stage shift register (101), and a clock (102) feeding pulses into the 21-bit ripple counter with a frequency of $1/t_o$.

The logarithmic clock is started when a pulse from the step generator (shown in FIG. 10) is applied to the specimen. FIG. 18 also illustrates the states of the first three stages of the ripple counter with respect to the pulses from the clock. The state of each stage of the counter is changed for each negative transition of the previous stage, and so the duration of each state of any stage is double that of the stage preceding it. With each successive pulse from the pulse generator, the ripple counter is reset and the shift register moved on one place. Thus for the n th pulse of the generator, the n th stage of the shift register will be at a logical 1 and a signal will pass to the output (103) each time the n th stage of the counter becomes a logical 1. However, the sample control responds only to the first positive transition from the output (103) of the logarithmic clock for each pulse.

Thus on the first pulse from the step generator, switch S1 of the sampler is opened by the first positive transition of stage 1. The shift register then moves on one place, and for the second pulse from the step generator, switch S1 of the sampler is opened on the first positive transition of stage 2. In this manner, a single sample is taken for each pulse from the step generator, but the sampling time for each successive pulse is increased logarithmically. 20 one such times can be obtained, having durations from $t_o.2^0$ to $t_o.2^{20}$, where $t_o$ is the clock period and thus the first sampling time.

The principle use of the apparatus is in the determination of the dielectric parameters of a material from the measured charge/time response using approximations to the Fourier transform. From the Fourier transform:

$$\epsilon^*(\omega) = \epsilon'(\omega) - j\epsilon''(\omega) = \int_0^\infty i(t) \cdot e^{-i\omega t} dt \quad (1)$$

we have derived the following approximations:

$$\epsilon'(\omega) = \sum_{p=-\infty}^{+\infty} \Delta q(n) \cdot x(n) \quad (2)$$

$$\epsilon''(\omega) = \sum_{p=-\infty}^{+\infty} \Delta q(n) \cdot y(n) \quad (3)$$

where $n = 2^p$
$q$ is the quantity of electricity on the sample,
$t$ is the time of sampling $$\Delta q(n) = q(\sqrt{2} n t_1) - q\left(\frac{n t_1}{\sqrt{2}}\right)$$

(i.e. the first order difference between $q(t)$ samples using a logarithm base of 2),
$\omega = 1/t_1$
$x(n)$ and $y(n)$ are constant coefficients.

The approximations, i.e. equations 2 and 3 were obtained as follows:

FIG. 19 shows graphically the function to be approximated. In the graph between $t_1/\sqrt{2}$ and $\sqrt{2} t_1$ let the function be approximated to by a straight line:

$$q = q\left(\frac{t_1}{\sqrt{2}}\right) + \left[q(\sqrt{2} t_1) - q\left(\frac{t_1}{\sqrt{2}}\right)\right] \cdot \log_2\left(\frac{\sqrt{2}}{t_1}\right) \quad (4)$$

thus the corresponding $$i(t) = \frac{dq}{dt}(t) = \frac{q(\sqrt{2} t_1) - q\left(\frac{t_1}{\sqrt{2}}\right)}{t \cdot \log_e 2} \quad (5)$$

Hence the assumption of linearity of $q$ with $\log t$ over the octave time interval is equivalent to making $i(t)$ inversely proportional to $t$ over the same period. The principle may be extended to the rest of the function by splitting it into octave intervals for all values of $t$, and in the general interval $(nt)_1/\sqrt{2}$ to $\sqrt{2} nt_1$:

$$q = q\left(\frac{n t_1}{\sqrt{2}}\right) + \left[q(n\sqrt{2} t_1) - q\left(\frac{n t_1}{\sqrt{2}}\right)\right] \log_2\left(\frac{\sqrt{2} t}{n t_1}\right) \quad (6)$$

equation 1 gives $$\epsilon^*(\omega) = \int_0^\infty i(t) \cdot e^{-i\omega t} dt$$

and from equation 6

$$i(t) = \frac{\Delta q(n)}{t \cdot \log_e 2} \quad (7)$$

for $$\frac{n t_1}{\sqrt{2}} \lesssim t \lesssim \sqrt{2} n t_1$$

thus $$\epsilon^*(\omega) = \frac{1}{\log_e 2}\left[\cdots + \Delta q(n) \int_{\frac{n t_1}{\sqrt{2}}}^{\sqrt{2} n t_1} \frac{1}{t} e^{-i\omega t} dt + \Delta q(2n) \int_{\sqrt{2} n t_1}^{\sqrt{2} n t_1} \frac{1}{t} e^{-i\omega t} dt + \cdots\right] =$$

$$\frac{1}{\log_e^2} \sum_{p=-\infty}^{+\infty} \Delta q(n) \cdot \int_{\frac{nt_1}{\sqrt{2}}}^{\sqrt{2}nt_1} \frac{1}{t} e^{-i\omega t} dt \tag{8}$$

or $$\epsilon^*(\omega) = \sum_{p=-\infty}^{+\infty} \Delta q(n) \cdot (x(n) - jy(n)) \tag{9}$$

where $$x(n) = \frac{1}{\log_e 2} \int_{\frac{nt_1}{\sqrt{2}}}^{\sqrt{2}nt_1} \frac{\cos \omega t}{t} dt$$

and $$y(n) = \frac{1}{\log_e 2} \int_{\frac{nt_1}{\sqrt{2}}}^{\sqrt{2}nt_1} \frac{\sin \omega t}{t} dt$$

$x(n)$ and $y(n)$ are functions of the product $n\omega t_1$ only and are tabulated below for various values of $n\omega t_1$:

TABLE I

| $n\omega t_1$ | $x(n)$ | $y(n)$ |
|---|---|---|
| 1/32 | 0.9996 | 0.0319 |
| 1/16 | 0.9980 | 0.0638 |
| 1/8 | 0.9916 | 0.1271 |
| 1/4 | 0.9665 | 0.2519 |
| 1/2 | 0.8683 | 0.4858 |
| 1 | 0.5128 | 0.8345 |
| 2 | −0.4136 | 0.8212 |
| 4 | −0.4294 | −0.5552 |
| 8 | 0.0514 | 0.1444 |
| 16 | 0.0873 | 0.0818 |
| 32 | 0.0658 | −0.0628 | as $n\omega t_1 \longrightarrow 0$ $\quad x(n) \longrightarrow 1$
$\qquad\qquad\qquad\quad y(n) \longrightarrow 0$ as $n\omega t_1 \longrightarrow \infty$ $\quad x(n) \longrightarrow 0$
$\qquad\qquad\qquad\qquad y(n) \longrightarrow 0$ In principle, $\omega t_1$ may have any value, but it is convenient to set it equal to unity, and so $\omega = (1/t_1)$
Thus from equation (9)
$\epsilon'(\omega) = \ldots + 0.996.\Delta q(1/32) + 0.9980.\Delta q(1/16) + \ldots$
$\qquad + 0.0658.\Delta q(32) + \ldots\ldots \tag{10}$
and
$\epsilon''(\omega) = \ldots\ldots + 0.0319.\Delta q(1/32) + 0.0638\Delta q(1/16)$
$\qquad + \ldots\ldots$
$\qquad - 0.0628\Delta q(32) + \ldots$
where $\omega = (1/t_1)$ It can be seen from Table 1 that $y(n)$ has its maximum value at about $n = 1$ and that it approaches zero roughly symmetrically on a logarithmic scale; thus it is apparent that for a given accuracy in $\epsilon''(\omega)$, it is only necessary to take a limited number of terms in the summation. Logically an equal number on either side of $t_1$ should be taken. FIG. 20 shows graphically approximations to the charge-time response. Thus values of $\Delta q$ lying outside this range can either be assumed zero (FIG. 20A) or more accurately, equal to those at the respective extremes of the range used (FIG. 20B). Hence, using the latter approximation, and taking 3 terms $$\epsilon_3''(\omega) = \frac{\Delta q(1/2)}{\log_e 2} \int_0^{\frac{\sqrt{2t_1}}{2}} \frac{1}{t} \sin \omega t \, dt + \Delta q(1).0.8345$$

$$+ \frac{\Delta q(2)}{\log_e 2} \int_{\frac{2t_1}{\sqrt{2}}}^{\infty} \frac{1}{t} \sin \omega t \, dt \tag{11}$$

Clearly a whole group of approximate transforms of varying precision can be thus derived, the simplest being the single term expression in which $\Delta q(1)$ is taken to be typical of the whole of $q(\log t)$ from $t = 0$ to $\infty$:

$$\epsilon_1''(\omega) = \frac{1}{\log_e 2} \cdot \Delta q(1) \int^{\infty} \frac{1}{t} \sin \omega t \, dt = \frac{1}{\log_e 2} \cdot \frac{\pi}{2} \cdot \Delta q(1) \tag{12}$$

This is equivalent to taking $$i(t) = \frac{\Delta q(1)}{t \cdot \log_e 2}$$

as valid for all time.

ie $\epsilon''(\omega) = (\pi/2) \cdot t_1 \cdot i(t_1), \omega = (1/t_1) \tag{13}$ This can be compared with the aforesaid Hamon approximation, $$\epsilon''(\omega) = 1.59 \, t \cdot i(t), \omega = (0.682/t) \tag{14}$$

In a similar way, a series of limited data transforms can be obtained for $\epsilon'(\omega)$, excepting that at small values of $n$ the coefficients $x(n)$ asymptotically approach 1. Thus it is necessary to know the total charge that has been transferred from $t = 0$ up to the first sampling time. Fortunately this is easily found experimentally. For example the 3-term version is $$\epsilon_3'(\omega) = q\left(\frac{t_1}{\sqrt{2.2}}\right) + \Delta q(1/2).0.8683$$

$$+ \Delta q(1).0.5128 + \frac{\Delta q(2)}{\log_e 2} \int_{\frac{2t_1}{\sqrt{2}}}^{\infty} \frac{1}{t} \cos \omega t \, dt \tag{15}$$

and the single term, simplest expression $$\epsilon_1'(\omega) = q\left(\frac{t_1}{\sqrt{2}}\right) + \frac{\Delta q(1)}{\log_e 2} \int_{\frac{t_1}{\sqrt{2}}}^{\infty} \frac{1}{t} \cos \omega t \, dt$$

$$= q \frac{t_1}{\sqrt{2}} - 0.156 \Delta q(1) \tag{16}$$

The Hamon method is not valid for $\epsilon'$ and so no comparable expression is obtained. The 1, 3 and 5 coefficient transforms for $\epsilon'$ and $\epsilon''$ may be summarized as follows.

$$\epsilon_5'(\omega) = q\left(\frac{1}{4}\frac{t_1}{\sqrt{2}}\right) + x(\frac{1}{4}) \cdot \Delta q(\frac{1}{4}) + x(\frac{1}{2}) \cdot \Delta q(\frac{1}{2})$$

$$+ x(1) \cdot \Delta q(1) + x(2) \cdot \Delta q(2) + x'(4) \cdot \Delta q(4)$$

$$\epsilon_3'(\omega) = q\left(\frac{1}{2}\frac{t_1}{\sqrt{2}}\right) + x(\frac{1}{2}) \cdot \Delta q(\frac{1}{2}) + x(1) \cdot \Delta q(1)$$

$$+ [x(2) + x'(4)] \cdot \Delta q(2)$$

$$\epsilon_1'(\omega) = q\left(\frac{t_1}{\sqrt{2}}\right) + [x(1) + x(2) + x'(4)] \cdot \Delta q(1)$$

$$\epsilon_5''(\omega) = y'(\tfrac{1}{4}) \cdot \Delta q(\tfrac{1}{4}) + y'(\tfrac{1}{2}) \cdot \Delta q(\tfrac{1}{2}) + y'(1) \cdot \Delta q(1)$$
$$+ y'(2) \cdot \Delta q(2) + y'(4) \cdot \Delta q(4)$$

$$\epsilon_3''(\omega) = [y'(\tfrac{1}{4}) + y'(\tfrac{1}{2})] \cdot \Delta q(\tfrac{1}{2}) + y'(1) \cdot \Delta q(1)$$
$$+ [y(2) + y'(4)] \cdot \Delta q(2)$$

$$\epsilon_1''(\omega) = [y'(1/4) + y'(1/2) + y'(1) + y'(2) + y'(4)] \cdot \Delta q(1)$$

where $$x'(4) = x(4) + x(8) + x(16) + \ldots$$
$$y'(1/4) = y(1/4) + y(1/8) + y(1/16) + \ldots$$
$$y'(4) = y(4) + y(8) + y(16) + \ldots$$

numerical values for $x(n)$ and $y(n)$ are given in Table 1 above. To obtain the dielectric parameters, these functions may be automatically applied to the digitized value of $v(t)$ which is held in the data store, by a processing means in which $v(t)$ is multiplied by the coefficient of the approximation, and where more than one coefficient is required, multiplies each signal by the required coefficient for each term of the approximation and providing a summation of all such terms. Our preferred processing means comprises a subtractor which determines the difference between successive signals representing the sample read into the data store, a multiplier in which said difference between successive signals is multiplied by one or more of the required coefficients $x(n)$ or $y(n)$ for the determination of permittivity or loss factor respectively, and the products thus obtained are summed in respect of each sample obtained, display means connected to the multiplier for displaying the summations produced in conjunction with the time interval used during sampling, and a control which controls the functioning of the processing means;

wherein the coefficients are defined according to the equations $$x(n) = \frac{1}{\log_e 2} \int_{\frac{nt_1}{\sqrt{2}}}^{\sqrt{2}nt_1} \frac{\cos \omega t}{t} dt$$

and $$y(n) = \frac{1}{\log_e 2} \int_{\frac{nt_1}{\sqrt{2}}}^{\sqrt{2}nt_1} \frac{\sin \omega t}{t} dt$$

The preferred means of display is one in which the summation from the processing means is plotted against the interval number, to give a graph of $\epsilon'$ or $\epsilon''$ against the log of the frequency, and may be an oscilloscope or a pen mechanism of an automatic plotter (e.g. an x-y recorder).

By way of illustration, FIG. 21 is a simplified diagram of a convenient data processing means. A suitable form of data store for use with such a processor has been included as part of FIG. 21 for clarity, and for the same reason the remainder of the diagram has been sub-divided into a calculation stage and a control.

The data store comprises two 12-stage shift registers and a 276-stage shift register (130, 131 and 132 respectively). The input of $v(t)$ from the 12-bit counter of FIG. 9 is via the multiple line (133) into the data store.

The calculation stage comprises a 12-bit parallel adder (134) connected to both the 12-stage shift registers of the data store by a multiple line. The output from the adder (134) is fed to a 10-stage shift register (135) by a multiple line and thence to a read-only-memory (136) containing 10 × 10 bit words and sign. The read-only-memory contains the coefficients required for the calculation. The output from the read-only-memory is fed to a 10-bit parallel adder (137) via a multiple line, and a read out for the sign of the coefficient is fed to a 1-bit adder (138). The output from the adder (137) is fed via a multiple line to an accumulator (138) comprising a 10-bit shift register having two outputs (139 and 1310) going back to the adder (137) via a multiple line, and to the 1-bit adder (138) respectively. The signal is then passed to a 12-bit shift register (1311) having a return line (1312) to the adder (138) and an output (1313) to the display means. The shift register (132) is also connected to the shift register (1311) via a gate (1314) enabled for the calculation of $\epsilon'$ by the operator.

The processor control has a 5-bit counter (1315) into which are fed pulses having a frequency of $1/t_o$ from the clock (92) shown in FIG. 18. The output from the counter (1315) goes to a 5-bit parallel adder (1317). A 3-bit counter (1318) controlled via a line (1319), is read into a translation network (1320) and the read-only-memory (136). The translation network (1320) has two operator-set controls being the selection of the number of terms in the approximation through the multiple line (1321) and a read/compute setting via line (1322). The output from the translation network is also fed to the adder (1317) and thence to a 5-bit comparator (1323) where it is compared with the number stored in a 5-bit counter (1324). The output from the comparator (1323) controls two gates, (1325) and (1326) respectively which control the feeding of pulses from a 100kHz clock (1327) to (i) data store registers via line (1328) and the counter (1324) via a divider (1329) where a division by 12 occurs, and (ii) to a 5-bit counter (1330).

The processor operates as follows. In the read-in mode as selected by line (1322), the output of the translation network (1320) is always 2, independent of the state Q of counter (1318). Thus the value $\pi$ of counter (1324) whose stage controls the address selected in the data store, at equilibrium always has a state $\pi = P + 2$ where $p$ is the state of counter (1315). Starting with $P = 0$, and hence $\pi = 2$, digitally coded words of $v(t)$ are entered via the multiple line (133) into shift register (130). Each time a new sample is entered the contents of counter (1315) are increased by one, i.e. the value of $p$ is increased by one. Thus the maximum rate at which data can be entered is set by the time taken for the data store register to move on by twelve places. With the 100 kHz clock used here, a minimum time of 120 $\mu s$ between successive words is implied. Although only 21 $v(t)$ samples are stored, 25 word locations are provided in the store, the spare places corresponding to terms for which no data is available but which are called up as the extremes of the time range are approached. Values for both $\epsilon'$ and $\epsilon''$ are calculated for each state $P$ of counter (1315) with the exception of the first: this is because the transforms operate on differences between successive $v(t)$ values.

In order to explain the operation of the system in the computing mode, the calculation of one value of $\epsilon''$ by the 5 coefficient transform will be taken as an example. How the operations differ for the less complex transforms and for $\epsilon'$ will be described afterwards. Under conditions of 5 term processing, the translation network does not modify the condition Q of counter (1318) and so the state $\pi$ of address counter (1324) is given by $\pi=P+Q$ under equilibrium. Assume that initially counter (1315) has state, P, and that counters (1318) (Q) and (1330) (D) and shift registers (138) (B) and (1311) (C) are all set at zero. As soon as the 5-bit comparator (1330) indicates that the address counter $\pi$ has attained equilibrium, clock signals are allowed to pass to the arithmetic control counter D. The time relationship of the various control signals derived from D is shown in FIG. 22. When D goes to state 1, the difference $\Delta v=v(t) - v(t/2)$ is entered in parallel form into shift register (135)(A). Between states 2 and 11 of counter D, a 10 pulse burst is developed which is applied both register A and to the parallel entry control of accumulator B. The effect of this is to perform a successive addition type of multiplication between the contents of A and the first coefficient, $y'(1/4)$, selected from the read-only-memory (136) by Q, the product $y'(1/4).\Delta v$ being held finally in B. The 12 pulse burst occurring between states 12 and 23 of D then causes the contents of B to be shifted out serially and so added or subtracted depending on the sign of the coefficient, to the contents of the output register C. D going to state 24 causes Q to be stepped on by 1 and thus the selection of a new address $\pi=P+1$. At this point D returns to zero, B is cleared and the system waits for the new address to be attained before performing the same process over again but with the next value of $\Delta v$ and a new coefficient, $y(1/2)$, selected by Q from the read-only-memory (136). In this way the of five products is built up in register C, corresponding to $\epsilon''(\omega)$. When the process has been performed five times, Q will be set to state five; this is detected and used to activate the pen mechanism of an x-y plotter whose vertical and horizontal axes are driven respectively by the analogue equivalents of the contents of C and P. When the plotting of the point is complete, P is stepped on by 1, Q, B, C and D are cleared and the five step process repeated for the next value of $\epsilon''$, and so on until the last state of P has been used, at which point this system stops.

When the less complex transforms (i.e. those using one or three terms), are in use; the function of the translation network is changed so that the appropriate values of $\Delta v$ are retained for more than one multiplication operation. The complete action of the translation network is most conveniently summarized in tabular form as follows:

TABLE 2

| INPUT | OUTPUT | | | |
|---|---|---|---|---|
| (Q) | Read-in | Compute | | |
| | | 1 term | 3 term | 5 term |
| 0 | 2 | 2 | 1 | 0 |
| 1 | 2 | 2 | 1 | 1 |
| 2 | 2 | 2 | 2 | 2 |
| 3 | 2 | 2 | 3 | 3 |
| 4 | 2 | 2 | 3 | 4 |

In the calculation of $\epsilon'$ it is necessary to add to the sum of products an initial value of $v(t)$. This is performed by passing the contents of the shift register store directly into C in serial form at the beginning of the calculation. For 3 or 1 coefficient calculations of $\epsilon'$, the first one or two products respectively are not required; the execution of these is prevented by inhibition of the read-only-memory output.

The apparatus has been used to measure the properties of a lumped circuit with a unique relaxation time (Debye behavior) and points for 1,3 and 5 coefficient transformations taken from actual recordings are superimposed upon the theoretical curves in FIG. 23 in which the relaxation time is $10^{-4}$s.

We claim:

1. An apparatus for measuring the charge-time response of an insulating material to a voltage step applied across it, which apparatus comprises:
   a capacitor for containing a specimen of the material as dielectric,
   a step generator connected to said capacitor for applying thereto a voltage step or repetition of such voltage steps in the form of a pulse train,
   a detector arranged to detect the charge on the specimen and to provide a signal proportional to said charge at its output,
   a sampler connected to the output of the detector, and having gating means and logarithmic timing means controlling the operation of said gating means so as to obtain from the output of the detector after a time interval from the application of the voltage step or successive steps, successive samples of the signal representing the charge on the specimen in consequence of said voltage step or steps applied thereto, said time intervals being increased logarithmically with successive samples, and
   a data store arranged to receive the samples.

2. An apparatus according to claim 1, having a reference capacitor in which the dielectric has substantially no dielectric loss, said reference capacitor and the capacitor containing the specimen being connected in series by connecting means, said connecting means being also connected to the input of the detector; the step generator being a bipolar step generator arranged to apply equal voltage steps or pulses of opposite polarity substantially simultaneously to the two capacitors.

3. An apparatus according to claim 1 in which the detector comprises an electrometer amplifier having an inputs stage comprising an insulated gate field effect transistor followed by one or more amplification stages, a capacitor being connected in parallel with said input and amplification stages to provide an output voltage proportional to the charge applied at the input stage.

4. An apparatus according to claim 1 in which the sampler and data store are incorporated into a processing circuit comprising
   a sampling stage connected to the output of the detector, and having gating means for obtaining samples of the signal provided at the output of the detector and representing the charge on the specimen,
   a logarithmic clock connected to said gating means to provide control signals for the operation of the gating means in obtaining said samples at successive logarithmically separated times after the application of a voltage step to the specimen, a subtracting means connected to the sampling stage and arranged to determine the differences between successive samples, and read-out means connected to the output of the subtracting means and to the logarithmic clock for providing said differences in conjunction with the number of the sample in each case.

5. An apparatus according to claim 4 in which the sampling stage comprises a control gate operable according to control signals from the logarithmic clock, a counter, a linear clock producing a continuous train of pulses of constant frequency, said pulses being fed to both the counter and the subtracting means via said control gate, and a comparator for comparing the signal stored in the counter with the inputs signal, said comparator being arranged to apply an inhibit signal to said control gate when the analogue of the signal stored in the counter is greater than or equal to the inputs signal.

6. An apparatus according to claim 5 in which the logarithmic clock provides an inhibit signal of fixed duration to the control gate at each of the logarithmically separated times.

7. An apparatus according to claim 5 in which the subtracting means is a second counter controlled by the logarithmic clock, the pulses supplied from the linear clock via the control gate being fed to said second counter during each of the sampling intervals; the number of the pulses accumulating during each interval being fed to the read-out means and the counter reset on a signal from the logarithmic clock applied to the counter during the period in which the inhibit signal is being applied to the control gate by the logarithmic clock.

8. An apparatus according to claim 7 in which the read-out means comprises a digital to analogue converter and an oscilloscope, the signal from the second counter being applied to one of the deflection axes of the oscilloscope while a signal which increases by an equal increment for each interval is applied from the logarithmic clock to the second deflection axis of the oscilloscope.

9. An apparatus according to claim 8 in which the oscilloscope is adapted to retain on its screen the image of each set of signals for the duration of the determination.

10. An apparatus according to claim 1 in which the step generator is arranged to repeatedly apply a voltage pulse to the capacitor containing the specimen, each pulse having substantially the same amplitude as subsequent pulses.

11. Apparatus according to claim 10 in which the pulse generator is arranged to apply to the capacitor a train of rectangular pulses, each pulse having the same predetermined duration and said pulse train having substantially equal increments of time between successive pulses.

12. An apparatus according to claim 10 in which the sampler comprises:

a logarithmic clock, a switch operated on a signal from said logarithmic clock, a first storage capacitor connected to the output of the detector via said switch, whereby said storage capacitor is charged substantially to the output voltage of the detector when said switch is closed, a second storage capacitor arranged to be dischargeable linearly at a controlled rate, means for charging said second storage capacitor with a voltage dependent on the voltage of said first storage capacitor, and a timed ramp analogue to digital converter operative according to the time taken to discharge said second capacitor.

13. An apparatus according to claim 10 having processing means for obtaining at least one of the frequency dependent dielectric parameters permittivity($\epsilon'(\omega)$) and loss factor($\epsilon''(\omega)$), said processing means comprising:

a subtractor which determines the difference between successive signals representing the sample read into the data store, a multiplier in which said difference between successive signals is multiplied by one or more of the required coefficients $x(n)$ or $y(n)$ for the determination of permittivity or loss factor respectively, and the products thus obtained are summed in respect of each sample obtained, display means connected to the multiplier for displaying the summations produced in conjunction with the time interval used during sampling, and a control which controls the functioning of the processing means;

wherein the coefficients are defined according to the equations $$x(n) = \frac{1}{\log_e 2} \int_{\frac{nt_1}{\sqrt{2}}}^{\sqrt{2}nt_1} \frac{\cos \omega t}{t} dt$$

and $$y(n) = \frac{1}{\log_e 2} \int_{\frac{nt_1}{\sqrt{2}}}^{\sqrt{2}nt_1} \frac{\sin \omega t}{t} dt$$

14. An apparatus according to claim 13 in which the display means is a plotting mechanism in which the summation from the processing means is plotted against the time interval number.

15. A method form measuring the charge-time response of an insulating material to a voltage step applied across it, which method comprises applying to a capacitor containing a specimen of the material as dielectric, a voltage step or repeated voltage steps in the form of a pulse train, and sampling the charge on the specimen after a time interval from the application of the voltage step, and repeating the sampling at subsequent time intervals from the same or subsequent voltage step application, said time intervals increasing logarithmically with successive samples.

16. A method according to claim 15 which comprises an equal voltage step of opposite polarity to a reference capacitor in which the dielectric has substantially no dielectric loss, and the quantity of charge measured is the sum of the charges which flow into the sample and into the reference capacitor.

17. A method of determining the dielectric loss of a material over a range of frequencies which comprises applying a unidirectional voltage step across a sample of the material whereby the potential difference across the sample is changed from a first value to a second value, measuring the quantity of charge which flows into the sample at said second value in the intervals between logarithmically separated times, and computing the loss factor ($\epsilon''$) with frequency ($\omega$) according to the equation $$\epsilon''(\omega) \approx A \frac{d(q(t))}{d(\log_e t)}$$

where $q(t)$ is the quantity of charge flowing through the sample at a time $t$ and A is a constant.

18. A method according to claim 17 which includes transforming the charge into a voltage proportional to the charge, and measuring the change in the voltage which occurs during the intervals between logarithmically separated times, the value obtained being used in place of the charge in computing the loss factor.

19. A method according to claim 17 which comprises plotting a signal proportional to the charge which flows for each interval along a first axis against the logarithm of the time of commencement of the interval along a second axis whereby the first axis is proportional to the dielectric loss and the second axis is proportional to the logarithm of the frequency.

20. A method according to claim 19 which includes applying the signals proportional to the charges to one of the deflection axes of an oscilloscope and applying the logarithm of the commencement of the intervals to the other deflection axis of the oscilloscope to display the sequence of signals thereon.

21. A method of determining dielectric parameters over a range of frequencies, comprising repeatedly applying a voltage step in the form of a pulse train to a capacitor containing a specimen of the material as dielectric, measuring the quantity of charge flowing into the sample after a time interval from the application of each voltage step such that successive time intervals are increased logarithmically, and computing one or both of the dielectric parameters permittivity ($\epsilon'(\omega)\epsilon''(\omega)$) respectively with frequency according to the equations $$\epsilon'(\omega) = \sum_{p=-\infty}^{+\infty} \Delta q(n) \cdot x(n)$$

and $$\epsilon''(\omega) = \sum_{p=-\infty}^{+\infty} \Delta q(n) \cdot y(n)$$

where $n = 2^p$, $q$ is the quantity of electricity in the sample, t is the time of sampling, $\Delta q(n)$ is the first order difference between $q(t)$ samples using a logarithm base of 2, and $x(n)$ and $y(n)$ are constant coefficients.

22. A method according to claim 21 which comprises determining the difference between the values of successive samples, multiplying each difference signal by the required coefficient, $x(n)$ or $y(n)$ respectively, and when more than one value for the coefficient is required for each sample, multiplying the value of the difference signal by each of the coefficients and summing the results, and displaying the result of the multiplication or the sums of the multiplications as the case may be for each sample, in conjunction with the time interval number.

23. A method according to claim 22 which comprises displaying the values of permittivity and loss factor by plotting the computed summations against the time interval number to give a graph of $\epsilon'$ or $\epsilon''$ respectively against the logarithm of the frequency.

24. A method according to claim 23 which comprises applying the computed summations to one deflection axis of an oscilloscope and applying the time interval numbers to the other deflection axis.

* * * * *